United States Patent
Murakami et al.

(10) Patent No.: US 6,787,623 B1
(45) Date of Patent: Sep. 7, 2004

(54) UNCONJUGATED CYCLOPOLYENE COPOLYMER, RUBBER COMPOSITION, AND USE

(75) Inventors: Hidetatsu Murakami, Kuga-Gun (JP); Keiji Okada, Kuga-Gun (JP); Masaaki Kawasaki, Ichihara (JP); Kotaro Ichino, Ichihara (JP)

(73) Assignee: Mitsui Chemicals, Inc., Tokyo (JP)

(*) Notice: Subject to any disclaimer, the term of this patent is extended or adjusted under 35 U.S.C. 154(b) by 393 days.

(21) Appl. No.: 09/787,890

(22) PCT Filed: Aug. 9, 2000

(86) PCT No.: PCT/JP00/05330

§ 371 (c)(1), (2), (4) Date: Mar. 26, 2001

(87) PCT Pub. No.: WO01/12686

PCT Pub. Date: Feb. 22, 2001

(30) Foreign Application Priority Data

Aug. 10, 1999 (JP) .......................... 11-226917

(51) Int. Cl.$^7$ .......................... C08F 236/20; C08L 9/00
(52) U.S. Cl. .................. 526/308; 526/281; 526/283; 526/336; 526/282; 525/211; 525/216; 152/209.1; 152/450
(58) Field of Search ............... 526/281, 282, 526/283, 308, 336; 525/211, 216, 212; 152/209.1, 450

(56) References Cited

U.S. PATENT DOCUMENTS 5,698,651 A * 12/1997 Kawasaki et al. .......... 526/336
5,922,823 A * 7/1999 Sagane et al. ............. 526/336

FOREIGN PATENT DOCUMENTS

| JP | 5-51413 A | 3/1993 |
| JP | 5-271487 A | 10/1993 |
| JP | 6-41364 A | 2/1994 |
| JP | 6-228242 A | 8/1994 |
| JP | 6-228378 A | 8/1994 |
| JP | 6-228380 A | 8/1994 |
| WO | WO 96/11983 A1 | 4/1996 |

OTHER PUBLICATIONS

Hackh's Chemical Dictionary, 4th ed., J. Grant (ed.), McGraw–Hill, N.Y., 1969, p. 199.*
Search Report issued in International Application No. PCT/JP00/05330, Nov. 1, 2000.

* cited by examiner

Primary Examiner—Fred Teskin
(74) Attorney, Agent, or Firm—Burns, Doane, Swecker & Mathis, L.L.P.

(57) ABSTRACT

A tire provided with a tire tread made from a rubber composition comprising
(A) a random copolymer based on non-conjugated cyclic polyene comprising structural units originated from one or more α-olefins (A1) and originated from one or more non-conjugated cyclic polyene (A2), the said random copolymer having a content of the structural unit(s) originated from one or more α-olefins (A1) in the range of 93 to 70 mole %; a content of the structural unit originated from one or more non-conjugated cyclic polyene (A2) in the range of 7 to 30 mole %; an intrinsic viscosity [η], determined in decalin at 135° C., in the range of 0.01 to 20 dl/g; a glass transition temperature (Tg) of not higher than 40° C.; and an iodine value in the range of 50 to 150, and
(B) a rubber based on diene,
in a weight proportion of {the random copolymer based on non-conjugated cyclic polyene (A)} versus {the rubber based on diene (B)} in the range from 60/40 to 0.1/99.9 exhibits a superior braking performance and, compatible therewith, a superior driving fuel cost aspect.

34 Claims, No Drawings

UNCONJUGATED CYCLOPOLYENE COPOLYMER, RUBBER COMPOSITION, AND USE

FIELD OF THE INVENTION

The present invention relates to a novel and useful copolymer based on non non-conjuated cyclic polyene, to a rubber composition containing such copolymer and a rubber based on diene and to uses of them.

DESCRIPTION OF THE RELATED TECHNIQUES

There has heretofore been employed in general a rubber composition composed of a styrene/butadiene copolymer rubber (SBR) and natural rubber for a rubber material for the tread of tires of automobile. However, it has been desired for a tire to have, in addition to high abrasion resistance and lower driving fuel cost concomitant with the recent trend of facilitation of energy economization, a high braking performance in respect of the traffic safety. Thus, there is a problem that conventionally employed product of a blend of styrene/butadiene copolymer rubber and natural rubber does not meet the above requirement.

As a rubber composition which can increase the braking performance and abrasion resistance of tires and can decrease the rolling resistance thereof, a raw rubber blend for tire tread composed of a polybutadiene rubber and a halogen-containing polyisobutylene/isoprene rubber is described in Japanese Patent Kokai Sho 56-93738 A. However, also by this rubber blend, the abrasion resistance, the braking performance and the effects of reduction in the rolling resistance are not sufficient.

An object of the present invention is to provide a novel and useful copolymer based on non-conjugated cyclic polyene capable of serving favorably as a constituent of rubber material for tires.

Another object of the present invention is to provide a rubber composition containing the above copolymer based on non-conjugated cyclic polyene capable of producing tires exhibiting a superior braking performance and a superior driving fuel cost aspect in a compatible manner.

A further object of the present invention is to provide a rubber material for tires containing the above copolymer based on non-conjugated cyclic polyene or the above rubber composition and exhibiting superior properties required for a tire, especially a superior braking performance and a superior driving fuel cost aspect in a compatible manner.

A still further object of the present invention is to provide a tire tread produced from the above rubber material for tires and to provide a tire having such a tire tread.

DISCLOSURE OF THE INVENTION

The present invention consists in the random copolymer based on non-conjugated cyclic polyene, in the rubber composition and in the use thereof as given in the following:

(1) A random copolymer based on non-conjugated cyclic polyene comprising structural units originated from one or more α-olefins (A1) and originated from one or more non-conjugated cyclic polyenes (A2), the said random copolymer having characteristic features comprising
a content of the structural unit(s) originated from the said one or more α-olefins (A1) in the range of 93 to 70 mole %,
a content of the structural unit originated from the said one or more non-conjugated cyclic polyenes (A2) in the range of 7 to 30 mole %,
an intrinsic viscosity [η], determined in Decalin at 135° C., in the range of 0.01 to 20 dl/g,
a glass transition temperature (Tg) of not higher than 40° C. and
an iodine value in the range of 50 to 150.

(2) A random copolymer based on non-conjugated cyclic polyene comprising structural units originated from one or more α-olefins (A1), originated from one or more non-conjugated cyclic polyenes (A2) and originated from one or more non-conjugated linear polyenes (A3), the said random copolymer having characteristic features comprising
a content of the structural unit(s) originated from the said one or more α-olefins (A1) in the range of 97.9 to 55 mole %,
a content of the structural unit originated from the said one or more non-conjugated cyclic polyenes (A2) in the range of 2 to 30 mole %,
a content of the structural unit originated from the said one or more non-conjugated linear polyenes (A3) in the range of 0.1 to 15 mole %,
an intrinsic viscosity [η], determined in Decalin at 135° C., in the range of 0.01 to 20 dl/g,
a glass transition temperature (Tg) of not higher than 40° C. and
an iodine value in the range of 5 to 150.

(3) The random copolymer as defined in the above (1) or (2), wherein the structural unit(s) originated from one or more α-olefins (A1) comprise at least a structural unit originated from ethylene in which the mole ratio of (the structural unit originated from ethylene) versus (the structural unit(s) originated from other α-olefin(s) having 3 or more carbon atoms) is in the range from 100/0 to 1/99.

(4) The random copolymer as defined in the above (1) or (2), wherein the structural unit(s) originated from one or more α-olefins (A1) comprise at least a structural unit originated from ethylene in which the mole ratio of (the structural unit originated from ethylene) versus (the structural unit(s) originated from other α-olefin(s) having 3 or more carbon atoms) is in the range of 100/0 to 50/50.

(5) The random copolymer as defined in any one of the above (1) to (4), wherein the non-conjugated cyclic polyene (A2) is that represented by the formula (1-1) given below:

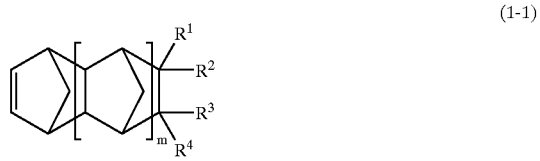

(1-1)

in which m is an integer of 0 to 2, $R^1$ to $R^4$ denote each, independently of each other, an atom or a residue selected from the group consisting of hydrogen atom, halogen atoms and hydrocarbon residues which may have double bond, wherein $R^1$ to $R^4$ may be fused together to form a mono- or polycyclic ring which may have double bond or wherein an alkylidene radical may be formed from the pair of $R^1$ and $R^2$ or $R^3$ and $R^4$ or, further, $R^1$ and $R^3$ or $R^2$ and $R^4$ may be fused together so as to form a double bond, with the proviso that at least one of $R^1$ to $R^4$ stands for an unsaturated hydrocarbon residue having at least one double bond, in case the mono- or polycyclic ring formed from $R^1$ to $R^4$ by being fused together has no double bond, in case the pair of $R^1$ and $R^2$ or $R^3$ and $R^4$ does not form an alkylidene radical and in case $R^1$ and $R^3$ or $R^2$ and $R^4$ are not fused together to form an endocyclic double bond.

(6) The random copolymer as defined in any one of the above (2) to (5), wherein the non-conjugated linear polyene (A3) is represented by the formula (2-1) given below:

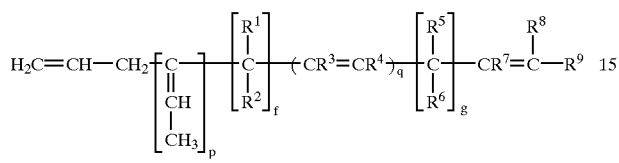

(2-1)

in which p and q is zero or 1 with the proviso that p and q are not zero simultaneously, f is an integer of zero to 5 with the proviso that f is not zero when both p and q are 1, g is an integer of 1 to 6, $R^1$, $R^2$, $R^3$, $R^4$, $R^5$, $R^6$ and $R^7$ denote each, independently of each other, hydrogen atom or an alkyl group having 1–3 carbon atoms, $R^8$ denoted an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

(7) A rubber composition comprising
(A) a random copolymer based on non-conjugated cyclic polyene comprising structural units originated from one or more α-olefins (A1) and originated from one or more non-conjugated cyclic polyenes (A2), the said random copolymer having characteristic features comprising a content of the structural unit(s) originated from the said one or more α-olefins (A1) in the range of 93 to 70 mole %; a content of the structural unit originated from the said one or more non-conjugated cyclic polyenes (A2) in the range of 7 to 30 mole %; an intrinsic viscosity [η], determined in Decalin at 135° C., in the range of 0.01 to 20 dl/g; a glass transition temperature (Tg) of not higher than 40° C.; and an iodine value in the range of 50 to 150, and
(B) a rubber based on diene,
wherein the weight proportion of (the random copolymer based on non-conjugated cyclic polyene) versus (the rubber based on diene), namely, (A/(B), is in the range of 60/40 to 0.1/99.9.

(8) A rubber composition comprising
(A) a random copolymer based on non-conjugated cyclic polyene comprising structural units originated from one or more α-olefins (A1), originated from one or more non-conjugated cyclic polyenes (A2) and originated from one or more non-conjugated linear polyenes (A3), the said random copolymer having characteristic features comprising a content of the structural unit(s) originated from the said one or more α-olefins (A1) in the range of 97.9 to 55 mole %; a content of the structural unit originated from the said one or more non-conjugated cyclic polyenes (A2) in the range of 2 to 30 mole %; a content of the structural unit originated from the said one or more non-conjugated linear polyenes (A3) in the range of 0.1 to 15 mole %; an intrinsic viscosity [η], determined in Decalin at 135° C., in the range of 0.01 to 20 dl/g; a glass transition temperature (Tg) of not higher than 40° C.; and an iodine value in the range of 5 to 150, and
(B) a rubber based on diene,
wherein the weight proportion of (the random copolymer based on non-conjugated cyclic polyene) versus (the rubber based on diene), namely, (A/(B), is in the range of 60/40 to 0.1/99.9.

(9) The rubber composition as defined in the above (7) or (8) wherein the structural unit(s) originated from one or more α-olefins (A1) in the random copolymer based on non-conjugated cyclic polyene comprise at least a structural unit originated from ethylene, wherein the mole ratio of (the structural unit originated from ethylene) versus (the structural unit(s) originated from other α-olefin(s) having 3 or more carbon atoms) is in the range of 100/0 to 1/99.

(10) The rubber composition as defined in the above (7) or (8) wherein the structural unit(s) originated from one or more α-olefins (A1) in the random copolymer based on non-conjugated cyclic polyene comprise at least a structural unit originated from ethylene, wherein the mole ratio of (the structural unit originated from ethylene) versus (the structural unit(s) originated from other α-olefin(s) having 3 or more carbon atoms) is in the range of 100/0 to 50/50.

(11) The rubber composition as defined in any one of the above (7) to (10), wherein the non-conjugated cyclic polyene (A2) is that represented by the formula (1-1).

(12) The rubber composition as defined in any one of the above (8) to (11), wherein the non-conjugated linear polyene (A3) is that represented by the formula (2-1).

(13) A rubber material for tires, comprising the random copolymer based on non-conjugated cyclic polyene as difined in any one of the above (1) to (6).

(14) A rubber material for tires, comprising the rubber composition as difined in any one of the above (7) to (12).

(15) A tire tread produced from the rubber material for tires as defined in the above (13) or (14).

(16) A tire which has a tire tread as defined in the above (15).

The copolymer based on non-conjugated cyclic polyene to be incorporated according to the present invention is a random copolymer comprising structural unit(s) originated from one or more α-olefins (A1) and a structural unit originated from one or more non-conjugated cyclic polyenes (A2) and has characteristic features comprising a content of the structural unit(s) of the α-olefin(s) (A1) in the range from 93 to 70 mole %, preferably from 93 to 75 mole %, more preferably from 93 to 80 mole %, a content of the structural unit of the non-conjugated cyclic polyene (A2) in the range from 7 to 30 mole %, preferably from 7 to 25 mole %, more preferably from 7 to 20 mole %, an intrinsic viscosity [72T], determined in Decalin (decahydronaphthalene) at 135° C., in the range from 0.01 to 20 dl/g, preferably from 0.1 to 10 dl/g, more preferably from 0.5 to 5 dl/g, a glass transition temperature (Tg) of not higher than 40° C., preferably in the range from −30° C. to +20° C., more preferably from −30° C. to +15° C., most preferably from −30 to +10° C., and an iodine value in the range from 35 to 150, preferably from 35 to 130, more preferably from 35 to 120.

The copolymer based on non-conjugated cyclic polyene to be incorporated according to the present invention may also be a random copolymer comprising structural unit(s) originated from one or more α-olefins (A1) and structural units originated from a non-conjugated cyclic polyene (A2) and originated from one or more non-conjugated linear polyenes (A3) and has characteristic features comprising a content of the structural unit(s) originated from the α-olefin(s) (A1) in the range from 97.9 to 55 mole %, preferably from 97 to 70 mole %, more preferably from 97 to 80 mole %, a content of the structural unit originated from the nonconjugated cyclic polyene (A2) in the range from 2 to 30 mole %, preferably from 2.5 to 25 mole %, more preferably from 2.5 to 15 mole %, a content of the structural unit(s) originated from the non-conjugated linear polyene(s) (A3) in the range from 0.1 to 15 mole %, preferably from 0.5 to 10 mole %, more preferably from 0.5 to 5 mole %, an intrinsic viscosity [η], determined in Decalin (decahydronaphthalene) at 135° C., in the range from 0.01 to 20 dl/g, preferably from 0.01 to 10 dl/g, more preferably from 0.5 to 5 dl/g, a glass transition temperature (Tg) of not higher than 40° C., preferably in the range from −30° C. to +20° C., more preferably from −30° C. to +10° C., and an iodine value in the range from 5 to 150, preferably from 10 to 130, more preferably from 10 to 120.

The glass transition temperature (Tg) can be determined by a dynamic rheological testing method from the peak on the damping factor in the observation of the temperature dispersion.

Due to the above characteristic features with respect to the contents of the structural units originated from the α-olefin(s) (A1) and originated from the non-conjugated cyclic polyene(s) (A2) or the contents of the structural units of originated from the α-olefin(s) (A1), originated from the non-conjugated cyclic polyene (A2) and originated from the non-conjugated linear polyene(s) (A3), the glass transition temperature (Tg) and the iodine value, the random copolymer based on non-conjugated cyclic polyene according to the present invention can afford, when used solely or in combination with a rubber based on diene (B), which will be described afterwards, to obtain tires with treads exhibiting an improved braking performance due to increased grasping or clinging action onto the traffic road face with simultaneous attainment of a compatibility with an improvement of the driving fuel cost due to reduction of rolling resistance during steady running, wherein the balance between the above-mentioned characteristic features will be more superior if the values of these features are in the above preferable ranges and further in the more preferable ranges.

Due to the intrinsic viscosity held in the above-defined range, the random copolymer based on non-conjugated cyclic polyene according to the present invention is superior in the mechanical strength and in the workability, wherein the closer the intrinsic viscosity value to the above-mentioned preferable range and further to the above-mentioned more preferable range, the more superior these properties will be.

When the random copolymer based on non-conjugated cyclic polyene according to the present invention is used as a constituent of the rubber material for tires, its crystallinity should preferably be lower.

As the α-olefins (A1) constituting the random copolymer based on non-conjugated cyclic polyene according to the present invention, there may be used those having 2–20 carbon atoms, preferably 3–15 carbon atoms, such as, ethylene, 1-butene, 1-hexene, 1-octene, 1-decene, 1-dodecene and 4-methyl-1-pentene. These α-olefins (A1) may be used either solely or in a combination of two or more of them.

The random copolymer based on non-conjugated cyclic polyene according to the present invention may favorably contain, as the structural unit(s) originated from one or more α-olefins (A1), at least a structural unit originated from ethylene, wherein the mole ratio of the structural unit originated from ethylene versus the structural unit(s) originated from other α-olefin(s) having 3 or more carbon atoms may be in the range from 100/0 to 1/99, preferably from 100/0 to 50/50, more preferably from 95/5 to 50/50.

For the non-conjugated cyclic polyene (A2) constituting the random copolymer based on non-conjugated cyclic polyene to be incorporated according to the present invention, every cyclic compound having two or more non-conjugated unsaturation bonds can be employed without any restriction, wherein preference is given to non-conjugate cyclic polyenes represented by the above formula (1-1).

As the halogen atom denoted by $R^1$ to $R^4$ in the non-conjugated cyclic polyene (A2) represented by the above formula (1-1), there may be exemplified fluorine atom, chlorine atom, bromine atom and iodine atom.

As the hydrocarbon residues denoted by $R^1$ to $R^4$ in the above formula (1-1), there may be enumerated, for example, alkyls having 1 to 20 carbon atoms, halogenated alkyls having 1 to 20 carbon atoms, cycloalkyls having 3 to 15 carbon atoms, aroamtic hydrocarbon residues having 6 to 20 carbon atoms and unsaturated hydrocarbon residues having at least one double bond. More concretely, as the alkyls, there may be exemplified methyl, ethyl, propyl, isopropyl, amyl, hexyl, octyl, decyl, dodecyl and octadecyl. As the halogenated alkyl, there may be exemplified those in which at least a part of the hydrogen atoms in the alkyls mentioned above is replaced by a halogen atom, such as fluorine, chlorine, bromine or iodine. As the cycloalkyls, there may be exemplified cyclohexyl and the like. As the aroamtic hydrocarbon residues, there may be exemplified phenyl and naphthyl. As the unsaturated hydrocarbon residues, there may be exemplified vinyl and allyl.

In the formula (1-1), the pairs of $R^1$ and $R^2$, $R^3$ and $R^4$, $R^1$ and $R^3$, $R^2$ and $R^4$, $R^1$ and $R^4$ as well as $R^2$ and $R^3$ may form each a mono- or polycyclic ring by combining each other (under cooperation), wherein such mono- or polycyclic ring may have double bond(s).

It is also possible that the pair $R^1$ and $R^2$ or $R^3$ and $R^4$ in the formula (1-1) may form together an alkylidene radical. Such an alkylidene radical may usually be that having 1 to 20 carbon atoms, with concrete examples including methylene ($CH_2=$), ethylidene ($CH_3CH=$), propylidene ($CH_3CH_2CH=$) and isopropylidene $\{(CH_3)_2C=\}$.

Concrete examples of the non-conjugated cyclic polyene (A2) represented by the formula (1-1) include alkylidene-containing ones (A2-1) which have each an alkylidene radical formed from the pair of $R^1$ and $R^2$ or $R^3$ and $R^4$, polycyclic ones (A2-2) in which a mono- or polycyclic ring having at least one double bond is formed from $R^1$ to $R^4$ by combining each other, unsaturated hydrocarbon residue-containing ones (A2-3) in which at least one of $R^1$ to $R^4$ is a monovalent unsaturated hydrocarbon residue having one or more double bonds and ring-symmetrical ones (A2-4) in which either $R^1$ and $R^3$ or $R^2$ and $R^4$ are fused to form a double bond so that the resulting cyclic polyene has a geometric symmetry with respect to the straight line connecting the bridgehead carbon atoms or the commonly shared carbon atoms of the condenced ring with each other as the axis of symmetry.

Concrete examples of the alkylidene-containing non-conjugated cyclic polyene (A2-1) include those which are represented by the following formula (1-2)

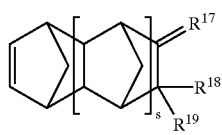

(1-2)

in which s stands for an integer of 0 to 2, $R^{17}$ denotes an alkylidene radical, $R^{18}$ and $R^{19}$ denote each, independently of each other, an atom or a residue selected from the group consisting of hydrogen atom, halogen atoms and hydrocarbon residues, wherein $R^{18}$ and $R^{19}$ may form together an alkylidene radical.

As the concrete examples of the alkylidene radicals denoted by $R^{17}$ in the formula (1-2), those which have 1–20 carbon atoms, such as methylene, ethylidene, propylidene and isopropylidene, may be recited.

The symbol s in the formula (1-2) may preferably stands for zero. As the halogen atom denoted by $R^{18}$ and $R^{19}$, those exemplified previously are recited. As the hydrocarbon residues, alkyls having 1 to 20 carbon atoms, halogenated alkyls having 1 to 20 carbon atoms, cycloalkyls having 3 to 15 carbon atoms and aromatic hydrocarbon residues having 6–20 carbon atoms may be recited.

As concrete examples of the alkylidene-containing non-conjugated cyclic polyene (A2-1) represented by the formula (1-2), there may be enumerated 5-methylene-2-norbornene, 5-ethylidene-2-norbornene (ENB) and 5-isopropylidene-2-norbornene as well as the compounds given below. Among them, preference is given to 5-ethylidene-2-norbornene.

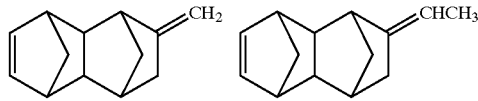

Concrete examples of the above-mentioned non-conjugated polycyclic polyene (A2-2) include dicyclopentadiene (DCPD), dimethyldicyclopentadiene and the compounds given below.

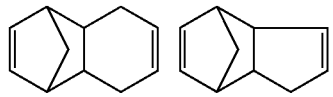

As concrete examples of the above-mentioned unsaturated hydrocarbon residue-containing non-conjugated cyclic polyene (A2-3), there may be enumerated 5-vinyl-2-norbornene and the compounds given below.

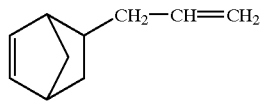

-continued

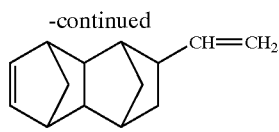

As concrete examples of the above-mentioned ring-symmetrical non-conjugated cyclic polyene (A2-4), the compounds given bolow may be recited.

For the non-conjugated cyclic polyene (A2) represented by the formula (1-1), those in which m stands for zero are preferred, wherein special preference is given to the alkylidene group-containing non-conjugated cyclic polyenes (A2-1) in which m in the formula (1-1) stands for zero, namely, those in which s in the formula (1-2) stands for zero, and to the polycyclic non-conjugated cyclopolyenes (A2-2) in which m in the formula (1-1) stands for zero. Most preferred ones among them are the alkylidene group-containing non-conjugated cyclic polyenes (A2-1) in which s in the formula (1-2) stands for zero, wherein, concretely, 5-ethylidene-2-norbornene (ENB) is most preferable.

The non-conjugated linear polyene (A-3) constituting the copolymer based on non-conjugated cyclic polyene according to the present invention is a compound having in the molecule two or more non-conjugated unsaturation bonds, for which non-conjugated dienes, non-conjugated trienes, non-conjugated tetraenes and the like may be employed. The non-conjugated linear polyene (A3) may be used either alone or in a combination of two or more thereof.

As the non-conjugated linear polyene (A3), non-conjugated trienes and tetraenes (A3-1) represented by the formula (2-1) given above, above all, non-conjugated trienes (A3-2) represented by the formula (2-2) given below are favorable in view of the balance between the braking performance and the fuel cost aspect, vulcanization feature, processing performance on the vulcanization (scorching stability) and so on.

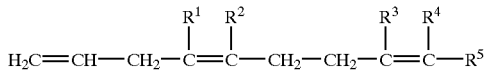

(2-2)

in which $R^1$ to $R^5$ denote each, independently of each other, hydrogen atom, methyl group or ethyl group, with the proviso that $R^4$ and $R^5$ do not stand for hydrogen atom simultaneously.

The non-conjugated trienes (A3-2) represented by the formula (2-2) correspond to the non-conjugated trienes or tetraenes (A3-1) represented by the formula (2-1) in which f is zero, g is 2, p is zero, q is 1 and $R^5$ and $R^6$ stand both for hydrogen atom. Among the non-conjugated trienes (A3-2) represented by the formula (2-2), those in which both $R^3$ and $R^5$ stand for methyl group are preferred, wherein the copolymer based on non-conjugated cyclic polyene according to the present invention obtained using such non-conjugated triene (A3-2) as the comonomer can be used for the rubber composition which will be described afterwards and from which tires superior especially in the braking performance and, compatible therewith, in the fuel cost aspect can be produced.

Concrete examples of the non-conjugated linear polyene (A3) include 1,4-hexadiene, 1,3-butadiene, isoprene, 7-methyl-1,6-octadiene, 6-methyl-1,6-octadiene, 6,7-dimethyl-1,6-octadiene, 7-methyl-1,6-decadiene, 6-methyl-1,6-nonadiene, 6,7-dimethyl-1,6-nonadiene, 7-methyl-1,6-nonadiene and 6-methyl-1,6-decadiene.

As the non-conjugated trienes and tetraenes (A3-1) represented by the formula (2-1), concretely compounds such as those given below (excluding those falling under the definition represented by the formula (2-2)) may be exemplified:

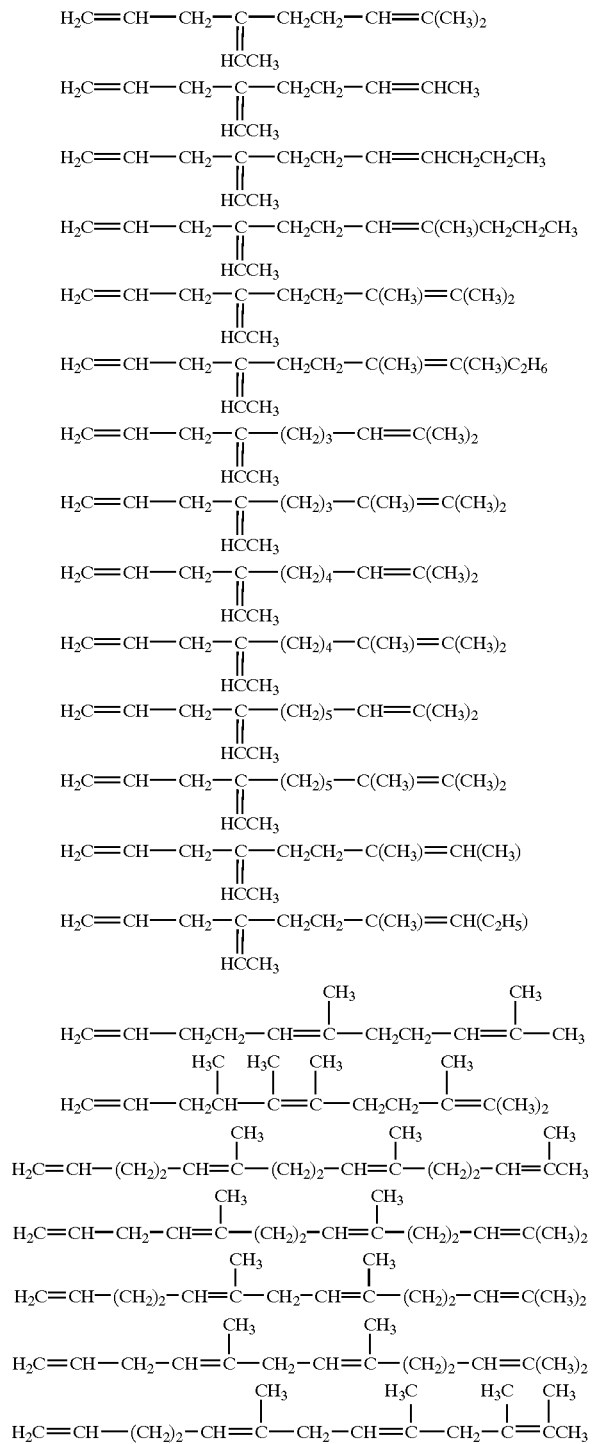

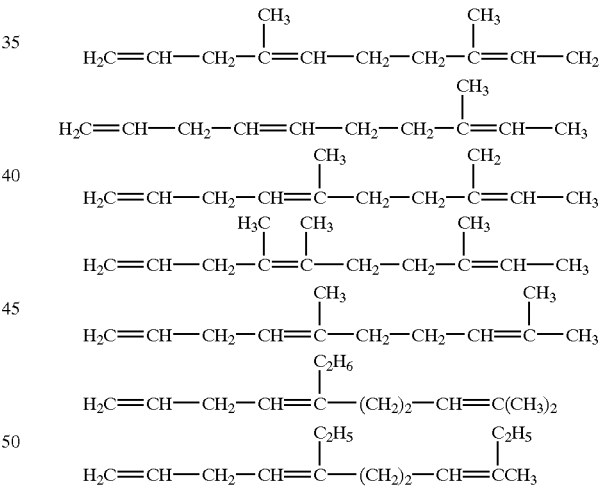

Among the above non-conjugated trienes and tetraenes (A3-1), the first given 4-ethylidene-8-methyl-1,7-nonadiene (abbreviated in the following sometimes as EMND) is favorable from the point of view of the braking performance and driving fuel cost aspect attained therewith.

Concrete examples of the non-conjugated trienes (A3-2) represented by the formula (2-2) include:

Among the above non-conjugated trienes (A3-2), the first given 4,8-dimethyl-1,4,8-decatriene (in the following, abbreviated sometimes as DMDT) is preferred.

The non-conjugated polyenes represented by the formulae (2-1) and (2-2) take usually geometrical isomeric structures (trans- and cis-isomers). The non-conjugated polyene (A3) to be used as a comonomer according to the present invention may be a mixture of the trans- and cis-isomers or composed solely of either one of the isomers.

The non-conjugated trienes and tetraenes (A3-1) represented by the formula (2-1) may be produced by a process known per se. For example, the non-conjugated trienes and tetraenes of the formula (2-1) in which p is zero and q stands for 1 can be produced as follows. First, a Grignard reagent (an allyl-MgX or vinyl-MgX) is prepared by reacting a vinyl group-containing halide (such as an allyl halide or a vinyl halide) with metallic magnesium. Then, by reacting a halide of a non-conjugated double bond-containing linear hydrocarbon (such as geranyl halide) with the above Grignard reagent, the non-conjugated triene or tetraene (A3-1) represented by the formula (2-1) is formed by radical reaction. Also, the non-conjugated triene or tetraene represented by the formula (2-1) in which p stands for 1 and q is zero can be produced by reacting a conjugated diene represented by the following formula (2-3) or (2-4) with ethylene. Concrete process of the production is described in detail in Japanese Patent Kokai A Hei 9-235327 (corresponding to U.S. Pat. No. 5,744,566) filed by the applicant.

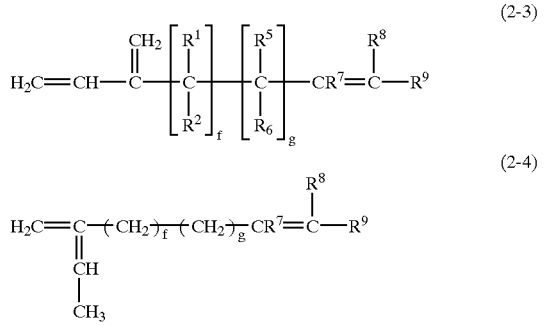

In the above formulae (2-3) and (2-4), f, g, $R^1$, $R^2$ and $R^5$ to $R^9$ have the same meanings as in the formula (2-1).

The non-conjugated triene (A3-2) represented by the formula (2-2) can be produced by reacting a triene compound having conjugated diene structure (denoted hereinafter as the triene having conjugated diene structure) represented by the formula (2-5) with ethylene.

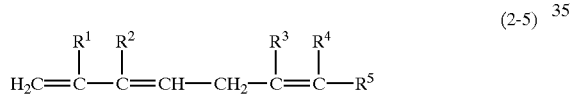

in which $R^1$, $R^2$, $R^3$, $R^4$ and $R^5$ have the same meanings as in the formula (2-2).

The reaction of the triene compound having conjugated diene structure represented by the formula (2-5) with ethylene may favorably be carried out at a temperature usually in the range from 30 to 200° C., preferably from 50 to 150° C., under an ethylene pressure usually in the range from 0.05 to 9.8 MPa (from 0.5 to 100 kgf/cm², gauge), preferably from 0.2 to 6.9 MPa (from 2 to 70 kgf/cm², gauge), for a reaction duration usually in the range from 0.5 to 30 hours. The reaction may be performed under an atmosphere of ethylene gas per se or an atmosphere of ethylene gas containing an inert gas, such as nitrogen or argon. While a reaction solvent is not particularly necessary, use thereof may be permitted. As the reaction solvent, there may be favorably be used, for example, hydrocarbon solvent, such as hexane, heptane, octane, nonane, decane, undecane, tridecane, toluene and xylene.

The reaction of the triene compound having conjugated diene structure represented by the formula (2-5) with ethylene is carried out usually in the presence of a catalyst. As the catalyst, for example, a catalyst made of a transition metal thiocyanate, one or more organic compounds capable of coordinating to the transition metal atom of the thiocyanate as ligand and an organoaluminum compound may be employed.

As the transition metal thiocyanate, there may be enumerated concretely thiocyanates of elements of Group 8 of the periodic table (that given by Groups of 1 to 18), such as iron and ruthenium; of Group 9 thereof, such as cobalt, rhodium and iridium; and of Group 10 thereof, such as nickel and palladium.

For the organic compound capable of coordinating to the tansition metal as ligand, there may be recited, for example, phosphorus-containing compounds, such as tri-o-tolylphosphine, triethylphosphine, tripropylphosphine, tributylphosphine, triphenylphosphine, bis(diphenylphosphino)methane, 1,2-bis(diphenylphosphino)ethane, 1,3-bis(diphenylphosphino)propane, 1,4-bis(diphenylphosphino)butane, triphenyl phosphite, triphenylphosphine oxide and triphenyl phosphate.

As the organoaluminum compound, there may be recited, for example, trimethylaluminum, triethylaluminum, triisobutylaluminum, dimethylaluminum chloride, diethylaluminum chloride, ethylaluminum dichloride and diethylaluminum ethoxide.

The random copolymer based on non-conjugated cyclic polyene according to the present invention can be produced by co-polymerizing an α-olefin (A1) and a non-conjugated cyclic polyene (A2), such as that represented by the formula (1-1), or by co-polymerizing an α-olefin (A1) with a non-conjugated cyclic polyene (A2), such as that represented by the formula (1-1), and a non-conjugated linear polyene (A3), such as that represented by the formula (2-1) in the presence of a catalyst. As the catalyst, those which are composed of a transition metal compound (C), such as a compound of vanadium (V), zirconium (Zr) or titanium (Ti), and an organoaluminum compound or an organoaluminum-oxy compound (D) and/or an ionizing ionic compound (E) may be employed.

Concrete examples of the catalyst include (1) a catalyst based on vanadium made of a soluble vanadium compound (c-1) and an organoaluminum compound (d-1) and (2) a catalyst based on metallocene composed of a metallocene (c-2) of a transition metal selected from the group consisting of metals of Group 4 of the periodic table of elements of 18 groups (which applies to all the cases in the following), an organoaluminum-oxy compound (d-2) and/or an ionizing ionic compound (e-1).

For the soluble vanadium compound (c-1) constituting the catalyst based on vanadium, compounds represented by the formulae (3) and (4) given below may be recited.

in which R denotes a hydrocarbon residue, X denotes a halogen atom and a, b, c and d satisfies the following conditions:

$0 \leq a \leq 3$, $0 \leq b \leq 3$, $2 \leq a+b \leq 3$, $0 \leq c \leq 4$, $0 \leq d \leq 4$ and $3 \leq c+d \leq 4$ As the soluble vanadium compound (c-1), electron donor-added products of soluble vanadium compounds obtained by contacting with an electron donor may also be employed.

As the organoaluminum compound (d-1) for building up the catalyst based on vanadium, those in which at least one Al—C bond is included in the molecule can be employed. Examples of such a compound include organoaluminum compounds exemplified by the following formula (5)

in which $R^1$ and $R^2$ represent each a hydrocarbon residue which may be identical with or different from each other and which has ordinarily 1 to 15 carbon atoms, preferably 1 to 4 carbon atoms, X denotes a halogen atom and m, n, p and q stand each for a numeral which mees the conditions $0<m \leq 3$, $0 \leq n<3$, $0 \leq p<3$, and $0 \leq q<3$, with m+n+p+q=3.

The metallocene (c-2) constituting the catalyst based on metallocene is that of a metal selected from the transition metals of Group 4 of the periodic table and is, concretely, one expressed by the following formula (7)

$$ML_x \qquad (7)$$

in which M denotes a transition metal selected from the Group 4 of the periodic table, x is the valence of the transition metal M and L represents a ligand.

Concrete examples of the transition metal in the formula (7) represented by the symbol M include zirconium, titanium and hafnium. The ligands L in the formula (7) coordinate to the transition metal M, wherein at least one of these ligands L has a cyclopentadienyl skeleton. This ligand having cyclopentadienyl skeleton may have substitutent(s).

Concrete examples of the ligand L having cyclopentadienyl skeleton include such groups as alkyl- or cycloalkyl-substituted cyclopentadienyl, such as, cyclopentadienyl, methylcyclopentadienyl, ethylcyclopentadienyl, n- and i-propylcyclopentadienyls, n-, i-, sec- and tert-butylcyclopentadienyls, dimethylcyclopentadienyl, methylpropylcyclopentadienyl, methylbutylcyclopentadienyl and methylbenzylcyclopentadienyl; and others, such as indenyl, 4,5,6,7-tetrahydroindenyl and fluorenyl.

These ligand groups having cyclopentadienyl skeleton may further be substituted by, for example, halogen atom(s) and trialkylsilyl group(s).

In case where the compound represented by the formula (7) has two or more groups having cyclopentadienyl skeleton as ligand L, two of these groups having cyclopentadienyl skeleton may be bound together through a bridging group, for example, an alkylene, such as ethylene or propylene; a substituted alkylene, such as isopropylidene or diphenylmethylene; silylene; or a substituted silylene, such as dimethylsilylene, diphenylsilylene or methylphenylsilylene.

For other ligands L than those having the cyclopentadienyl skeleton, namely, ligands without cyclopentadienyl skeleton, there may be enumerated, for example, hydrocarbon groups, alkoxy groups, aryloxy groups and sulfo-containing groups ($-SO_3R^a$, in which $R^a$ denotes an alkyl, a halogen-substituted alkyl, an aryl or a halogen- or alkyl-substituted aryl), which have 1–12 carbon atoms, as well as halogen atoms and hydrogen atom.

As the hydrocarbon groups having 1–12 carbon atoms for the ligand L, there may be enumerated such groups as alkyl, cycloalkyl, aryl and aralkyl and, more concretely, alkyl groups, such as methyl, ethyl, n-propyl, isopropyl, n-butyl, isobutyl, sec-butyl, tert-butyl, pentyl, hexyl, octyl, decyl and dodecyl; cycloalkyl groups, such as cyclopentyl and cyclohexyl; aryl groups, such as phenyl and tolyl; and aralkyl groups, such as benzyl and neophyl.

As the alkoxy group for the ligand L, there may be enumerated, for example, methoxy, ethoxy and n-propoxy. As the aryloxy group, for example, phenoxy may be enumerated. As the sulfo-containing group ($-SO_3^a$), there may be enumerated, for example, methanesulfonato, p-toluenesulfonato, trifluoromethanesulfonato and p-chlorobenzenesulfonato. As the halogen atom, fluorine, chlorine, bromine and iodine are exemplified.

When the transition metal of the metallocene represented by the formula (7) has a valency of 4, it may be represented more concretely by the formula (8):

$$R^2_k R^3_l R^4_m R^5_n M \qquad (8)$$

in which M is a transition metal same as that given in the formula (7), $R^2$ represents a group (ligand) having cyclopentadienyl skeleton, $R^3$, $R^4$ and $R^5$ represent each, independently of each other, a group (ligand) with or without cyclopentadienyl skeleton and k is an integer of 1 or higher, wherein k+l+m+n=4.

Examples of the metallocene (c-2) in which M is zirconium and which contains at least two ligands having each a cyclopentadienyl skeleton are given below:

Bis(cyclopentadienyl)zirconium monochloride monohidride,
bis(cyclopentadienyl)zirconium dichloride,
bis(1-methyl-3-butylcyclopentadienyl)zirconium dichloride and
bis(1,3-dimethylcyclopentadienyl)zirconium dichloride.

It is also possible to use a compound in which the 1,3-substituted cyclopentadienyl as given above is replaced by a corresponding 1,2-substituted cyclopentadienyl.

There may also be exemplified metallocenes (c-2) of bridged structure in which, in the above formula (8), at least two of the ligands $R^2$, $R^3$, $R^4$ and $R^5$, for example, $R^2$ and $R^3$ are the group (ligand) having cyclopentadienyl skeleton and such at least two groups are bound each other through, for example, alkylene, substituted alkylene, silylene or substituted silylene. In this case, the groups $R^4$ and $R^5$ stand, independently of each other, for the ligand L other than that having cyclopentadienyl skeleton as explained in the formula (7).

As the metallocene (C-2) of such a bridged structure, there may be enumerated, for example, ethylenebis(indenyl)dimethylzirconium,
ethylenebis(indenyl)zirconium dichloride,
isopropylidenebis(1-indenyl)zirconium dichloride,
isopropylidene(cyclopentadienyl-fluorenyl)zirconium dichloride,
diphenylsilylenebis(indenyl)zirconium dichloride,
methylphenylsilylenebis(indenyl)zirconium dichloride,
rac-ethylene(2-methyl-1-indenyl)2-zirconium dichloride,
rac-dimethylsilylene(2-methyl-1-indenyl)2-zirconium dichloride,
rac-dimethylsilylene-bis(4-phenyl-1-indenyl)zirconium dichloride,
rac-dimethylsilylene-bis(2-methyl-4-phenyl-1-indenyl) zirconium dichloride,
rac-dimethylsilylene-bis(2-methyl-4-(α-naphthyl)-1-indenyl)zirconium dichloride,
rac-dimethylsilylene-bis{2-methyl-4-(β-naphthyl)-1-indenyl}zirconium dichloride,
rac-dimethylsilylene-bis{2-methyl-4-(1-anthracenyl)-1-indenyl}zirconium dichloride and
diphenylmethylene(cyclopentadienyl-9-fluorenyl)zirconium dichloride.

It is also possible to use transition metal compounds in which zirconium of the above-recited compounds is replaced by titanium or by hafnium.

It is also possible to use compounds represented by the formula (9) given below, as the compound (c-2).

$$L^a MX_z \qquad (9)$$

in which M is a metal of Group 4 or of the lanthanide series of the periodic table, $L^a$ denotes a derivative of non-localized π-bonding group, which provides the active site of the metal M with a captive geometry, and the two Xs represent each, independently of each other, hydrogen atom, a halogen atom, a hydrocarbon group having 20 or less carbon atoms, a silyl group having 20 or less silicium atoms or a germyl group having 20 or less germanium atoms.

Among these compounds represented by the formula (9), preference is given to those expressed by the following formula (10):

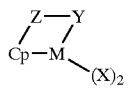
(10)

in which M is titanium, zirconium or hafnium, X has the same meaning as that of the formula (9), Cp denotes a substituted cyclopentadienyl group substituted by Z and bound to M by π-bonding, Z represents oxygen atom, sulfur atom, boron atom or an element of Group 4 of the periodic table, such as silicium, germanium or tin, and Y is a ligand containing nitrogen, phosphorus, oxygen or sulfur, wherein Z and Y may build up together a condensed ring.

Concrete examples of the compounds represented by the formula (10) include (t-butylamido)dimethyl(tetramethyl-$\eta^5$-cyclopentadienyl)silanetitanium dichloride, {(t-butylamido)(tetramethyl-$\eta^5$-cyclopentadienyl)-1,2-ethanediyl}titanium dichloride and the like.

It is also possible to use compounds in which titanium of the above metallocenes is replaced by zirconium or hafnium.

For the metallocenes (c-2) represented by the formulae (9) or (10), zirconocenes in which the central metal atom is zirconium and which have at least two cyclopentadienyl skeletons may favorably be used.

Now, the description is directed to the organic aluminum oxy-compound (d-2) and to the ionizing ionic compound (e-1) to be used for preparing the metallocene catalyst.

As the organic aluminum-oxy compound (d-2), known aluminoxanes and those benzene-insoluble organic aluminum-oxy compounds (d-2) may be used.

Concretely, these known aluminoxanes are represented by the following formulae (11) and (12):

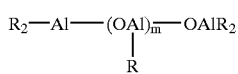
(11)

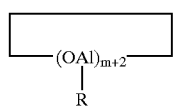
(12)

In the above formulae (11) and (12), R is a hydrocarbon group, such as methyl, ethyl, propyl or butyl, wherein preference is given for methyl and ethyl, especially for methyl, and m is an integer of 2 or greater, preferably of 5–40.

The aluminoxane of the formula (11) or (12) may be constituted of mixed alkyloxyaluminum units composed of an alkyloxyaluminum unit represented by the formula {OAl(R$^1$)} and of an alkyloxyaluminum unit represented by the formula {OAl(R$^2$)}, wherein R$^1$ and R$^2$ are each a hydrocarbyl group similar to that of R but are different from each other.

A content of small amount of organometallic compound (s) of other metal(s) than aluminum in addition to the organoaluminum-oxy compound (d-2) may be permissible.

For the ionizing ionic compound (e-1), which may sometimes be denoted as ionic ionizing compound or ionic compound, there may be exemplified Lewis acids, ionic compounds, boranes and carboranes.

For such a Lewis acid, compounds represented by the formula BR$_3$ (R may stand for fluorine or a phenyl group which may have substituent group(s), such as fluorine, methyl and trifluoromethyl) may be mentioned. Concrete example of the Lewis acid include trifluoroboron, triphenylboron, tris(4-fluorophenyl)boron, tris(3,5-difluorophenyl)boron, tris(4-fluoromethylphenyl)boron, tris (pentafluorophenyl)boron, tris(p-tolyl)boron, tris(o-tolyl) boron and tris(3,5-dimethylphenyl)boron.

As the ionic compounds, there may be enumerated, for example, trialkyl-substituted ammonium salts, N,N-dialkylanilinium salts, dialkylammonium salts and triarylphosphonium salts. For the trialkyl-substituted ammonium salt as the ionic compound, there may be enumerated, for example, triethylammonium tetra(phenyl)borate, tripropylammonium tetra(phenyl)borate and tri(n-butyl) ammonium tetra(phenyl)borate. For the dialkylammonium salt as the ionic compound, there may be enumerated, for example, di(1-propyl)ammonium tetra(pentafluorophenyl) borate and dicyclohexylammonium tetra(phenyl)borate.

As the ionic compound, there may further be enumerated triphenylcarbenium tetrakis(pentafluorophenyl)borate, N,N-dimethylanilinium tetrakis(pentafluorophenyl)borate and ferrocenium tetra(pentafluorophenyl)borate.

As the borane compound mentioned above, there may be enumerated decaborane(9); salts of metalborane anions, for example, bis[tri(n-butyl)ammonium]nonaborate, bis[tri(n-butyl)ammonium]decaborate and bis[tri(n-butyl) ammonium]bis(dodecahydridododecaborate)nickelate(III).

As the carboranes mentioned above, there may be enumerated, for example, salts of metalcarborane anions, such as 4-carbanonaborane(9), 1,3-dicarbanonaborane(8) and bis[tri(n-butyl)ammonium]bis(undecahydrido-7-carbaundecaborate)nickelate(IV).

These ionizing ionic compounds (e-1) may be used alone or in a combination of two or more of them.

For preparing the catalyst based on metallocene, it is possible to incorporate the above-mentioned organoaluminum compound (d-1) in addition to the organoaluminum-oxy compound (d-2) or the ionizing ionic compound (e-1).

For producing the copolymer based on non-conjugated cyclic polyene according to the present invention, the α-olefin (A1) and the non-conjugated cyclic polyene (A2) or the α-olefin (A1), the non-conjugated cyclic polyene (A2) and the non-conjugated linear polyene (A3) are subjected to copolymerization usually in liquid phase in the presence of the catalyst based on vanadium or metallocene as described above. Here, a hydrocarbon solvent is used in general, while these comonomers may be used as the solvent.

The copolymerization may be carried out in a batchwise or continuous way. On carrying out the copolymerization in batchwise way, the catalyst is used at a concentration as given below.

When a vanadium-based catalyst composed of the soluble vanadium compound (c-1) and the organoaluminum compound (d-1) is used, the concentration of the soluble vanadium compound in the polymerization system may usually be in the range from 0.01 to 5 mmol/liter (polymerization volume), preferably from 0.05 to 3 mmol/liter. The soluble vanadium compound (c-1) may favorably be supplied thereto at a concentration of at most ten times, preferably 1–7 times, more preferably 1–5 times, the concentrtion of the soluble vanadium compound present in the polymerization system. The organoaluminum compound (d-1) may be supplied thereto at a mole ratio of the aluminum atom versus the vanadium atom (Al/V) in the polymerization system of at least 2, preferably in the range from 2 to 50, more preferably from 3 to 20.

The soluble vanadium compound (c-1) and the organoaluminum compound (d-1) are supplied usually under dilution with the above-mentioned hydrocarbon in solvent and/or by the liquid comonomer(s). Here, it is preferable that the soluble vanadium compound (c-1) is diluted thereby to the above-mentioned concentration, while the organoaluminum compound (d-1) may preferably be supplied to the polymerization system under adjustment of its concentration at, for example, a value not exceeding 50 times the concentration thereof in the polymerization system.

In case a catalyst based on metallocene composed of the metallocene (c-2) and the organoaluminum-oxy compound (d-2) or the ionizing ionic compound (e-1) is used, the concentration of the metallocene (c-2) in the polymerization system may usually be in the range from 0.00005 to 0.1 mmol/liter (polymerization volume), preferably from 0.0001 to 0.05 mmol/liter. The organoaluminum-oxy compound (d-2) is supplied thereto at a mole ratio of aluminum to the transition metal of the metallocene (Al/transition metal) in the polymerization system in the range from 1 to 10,000, preferably from 10 to 5,000.

The ionizing ionic compound (e-1) may be supplied to the polymerization system at a mole ratio of the ionizing ionic compound (e-1) to the metallocene (c-2), namely, (ionizing ionic compound (e-1))/(metallocene (c-2)), in the polymerization system in the range from 0.5 to 20, preferably from 1 to 10.

In case the organoaluminum compound (d-1) is used, it is used usually in an approximate amount of 0–5 mmol/liter (polymerization volume), preferably 0–2 mmol/liter.

When the copolymerization is carried out in the presence of the catalyst based on vanadium, the copolymerization is carried out usually under the condition of a temperature in the range from −50° C. to +100° C., preferably from −30° C. to +80° C., more preferably from −20° C. to +60° C., under a pressure exceeding above 0 up to 4.9 MPa (50 kgf/cm$^2$, gauge), preferably exceeding above 0 up to 2.0 MPa (20 kgf/cm$^2$, gauge).

When the copolymerization is carried out in the presence of the catalyst based on metallocene, the copolymerization is carried out usually under the condition of a temperature in the range from −20° C. to +150° C., preferably from 0° C. to +120° C., more preferably from 0° C. to +100° C., under a pressure exceeding above 0 up to 7.8 MPa (80 kgf/cm$^2$, gauge), preferably exceeding above 0 up to 4.9 MPa (50 kgf/cm$^2$, gauge).

On the copolymerization, the α-olefin (A1) and the non-conjugated cyclic polyene (A2) or, on the other hand, the α-olefin (A1), the non-conjugated cyclic polyene (A2) and the non-conjugated linear polyene (A3) are supplied to the polymerization system in such a rate that the said copolymer based on non-conjugated cyclic polyene is obtained in the composition specified above. It is permissible on the copolymerization to use a molecular weight regulator, such as hydrogen.

By performing the copolymerization as described above, the copolymer based on non-conjugated cyclic polyene according to the present invention is obtained usually in a form of polymerization liquor containing it. This polymerization liquor is treated in a usual way to obtain the copolymer based on non-conjugated cyclic polyene.

The rubber composition according to the present invention is a rubber composition comprising the copolymer based on non-conjugated cyclic polyene {in the following, denoted as the non-conjugated cyclic polyene (A)} and a rubber based on diene (B), wherein the proportion of these components in weight ratio, i.e. the non-conjugated cyclic polyene (A)/rubber based on diene (B), may favorably be in the range from 60/40 to 0.1/99.9, preferably from 50/50 to 1/99, more preferably from 40/60 to 5/95. When the proportion of the contents of these components is in the range given above, tires produced therewith exhibit superior braking performance and excellent driving fuel cost aspect in a compatible manner and the rubber composition using it can reveal superior features in the improved weatherability, in the controlled damping rate and so on, wherein the closer the weight ratio to the above-mentioned preferable range is, the more superior the rubber composition in the balance between the braking performance and the driving fuel cost aspect and in the improvement of the weatherability and controlled damping rate will be.

As the diene-based rubber (B) to be incorporated according to the present invention, every known rubber based on diene having double bond(s) in the main chain can be used without restriction, wherein preference is given to a polymer product or a copolymer rubber made from a conjugated diene compound as the main comonomer. The diene-based rubber (B) encompasses natural rubber (NR) and hydrogenated rubber. For the diene-based rubber (B), those which have iodine values not lower than 100, preferably not lower than 200, more preferably not lower than 250 are preferred.

Concrete examples of the diene-based rubber (B) include natural rubber (NR), isoprene rubber (IR), styrene/butadiene rubber (SBR), butadiene rubber (BR), chloroprene rubber (CR), acrylonitrile/butadiene rubber (NBR), nitrile rubber and hydrogenated nitrile rubber. Among them, natural rubber (NR), isoprene rubber (IR), styrene/butadiene rubber (SBR) and butadiene rubber (BR) are preferred, wherein special preference is given to styrene/butadiene rubber (SBR). As the diene-based rubber (B), one single kind of rubber or a blend of two or more kinds of rubbers may be employed.

As the natural rubber (NB), those standardized by Green Book (international package standards for qualities of commercial grades of natural rubber) may be used.

As the isoprene rubber (IR), those having specific gravities in the range from 0.91 to 0.94 and Mooney viscosities ($ML_{1+4}$, 100° C.) in the range from 30 to 120 may favorably be employed.

As the styrene/butadiene rubber (SBR), those having specific gravities in the range from 0.91 to 0.98 and Mooney viscosities ($ML_{1+4}$, 100° C.) in the range from 20 to 120 may favorably be employed.

As the butadiene rubber (BR), those having specific gravities in the range from 0.90 to 0.95 and Mooney viscosities ($ML_{1+4}$, 100° C.) in the range from 20 to 120 may favorably be employed.

The rubber composition according to the present invention is a rubber composition capable of being vulcanized. While it may be used as a non-vulcanized product, more excellent characteristic features may be revealed by using it as a vulcanized product. The vulcanization may be carried out, for example, by a method of heating with employment of a vulcanizing agent (F) or by a method of irradiation of electron beam without using vulcanizing agent (F).

When the rubber composition according to the present invention is vulcanized by heating it, compounds constituting a vulcanizer system, including a vulcanizing agent (F), a vulcanization accelerator and a vulcanization assistant, may be admixed to the rubber composition.

As the vulcanizing agent (F), for example, sulfur, compounds based on sulfur and organic peroxides may be employed.

The morphological state of sulfur is not specifically restricted and, for example, powdery sulfur, precipitated sulfur, colloidal sulfur, surface-treated sulfur and insoluble sulfur may be employed.

As the compound based on sulfur mentioned above, there may be enumerated concretely, for example, sulfur chloride, sulfur dichloride, polymeric polysulfide, morpholine disulfide, alkylphenol disulfide, tetramethylthiuram disulfide and selenium dimethyldithiocarbamate.

As the organic peroxide mentioned above, there may be enumerated concretely, for example, alkyl peroxides, such as dicumyl peroxide, di-tert-butyl peroxide, di-tert-butylperoxy-3,3,5-trimethylcyclohexane, tert-butylcumyl peroxide, di-tert-amyl peroxide, 2,5-dimethyl-2,5-di(tert-butylperoxy)hexine-3,2,5-dimethyl-2,5-di(benzoylperoxy) hexane, 2,5-dimethyl-2,5-di(tert-butylperoxy)hexane, α,α'- bis(tert-butylperoxy-m-isoprpyl)benzene and tert-butyl hydroperoxide; peroxyesters, such as tert-butyl peroxyacetate, tert-butyl peroxyisobutyrate, tert-butyl peroxypivalate, tert-butyl peroxymaleate, tert-butyl peroxyneodecanoate, tert-butyl peroxybenzoate and di-tert-butyl peroxyphthalate; and ketone peroxides, such as dicyclohexanone peroxide. They may be employed in a combination of two or more.

Among them, organic peroxides having one minute half-value period temperatures in the range from 130 to 200° C. are preferred, in which concretely dicumyl peroxide, di-tert-butyl peroxide, di-tert-butylperoxy-3,3,5-trimethylcyclohexane, tert-butylcumyl peroxide, di-tert-amyl peroxide and tert-butyl hydroperoxide are preferable.

Among the above-recited vulcanizing agents (F), in particular, sulfur and compounds based on sulfur, especially sulfur is favorable, since a rubber composition exhibiting superior characteristic properties can be obtained by the use thereof.

In case the vulcanizing agent (F) is sulfur or a compound based on sulfur, it may be incorporated in an amount of 0.1–10 parts by weight, preferably 0.5–5 parts by weight, per 100 parts by weight of the total sum of the copolymer based on non-conjugated cyclic polyene (A) plus the diene-based rubber (B).

In case the vulcanizing agent (F) is an organic peroxide, it may be incorporated in an amount of 0.05–15 parts by weight, preferably 0.15–5 parts by weight, per 100 parts by weight of the total sum of the copolymer based on non-conjugated cyclic polyene (A) plus the diene-based rubber (B).

When sulfur or a compound based on sulfur is used as the vulcanizing agent (F), it is preferable to use concurrently a vulcanizing accelerator.

As the vulcanizing accelerator, there may be exemplified concretely, sulfenamides, such as N-cyclohexyl-2-benzothiazole sulfenamide (CBS), N-oxydiethylene-2-benzothiazole sulfenamide and N,N-diisopropyl-2-benzothiazole sulfenamide; thiazole compounds, such as 2-mercaptobenzothiazole (MBT), 2-(2,4-dinitrophenyl) mercaptobenzothiazole, 2-(2,6-diethyl-4-morpholinothio) benzothiazole, 2-(4'-morpholinodithio)benzothiazole and dibenzothiazyl disulfide; guanizine compounds, such as diphenylguanizine, triphenylguanizine, diorthonitrile guanidine, orthonitrile biguanide and diphenylguanizine phthalate; aldehydoamino and aldehydoammonium compounds, such as acetaldehyde-aniline reaction products, butylaldehydeaniline condensed products, hexamethylenetetramine and acetaldehyde ammonia; imidazoline compounds, such as 2-mercaptoimidazoline; compounds based on thiourea, such as thiocarbanilide, diethylthiourea, dibutylthiourea, trimethylthiourea and di-o-tolylthiourea; thiuram compounds, such as tetramethylthiuram monosulfide, tetramethylthiuram disulfide (TMTD), tetraethylthiuram disulfide, tetrabutylthiuram disulfide, pentamethylenethiuram tetrasulfide and dipentamethylenethiuram tetrasulfide (DPTT); compounds based on dithioacid salt, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and t llurium dimethyldithiocarbamate; xanthates, such as zinc dibutyl xanthogenate; and zinc white.

The vulcanizing accelerator mentioned above may favorably be incorporated in an amount in the range from 0.1 to 20 parts by weight, preferably from 0.2 to 10 parts by weight, per 100 parts by weight of the total sum of the copolymer based on non-conjugated cyclic polyene (A) plus the diene-based rubber (B).

In the case of using an organic peroxide as the vulcanizing agent (F), it is favorable to use concurrently a vulcanization assistant in an amount of 0.5–2 moles per one mole of the organic peroxide, preferably in an amount nearly equivalent thereto.

As the vulcanization assistant, there may be exemplified concretely, in addition to sulfur and a compound based on quinone dioxime, such as p-quinone dioxime, a polyfunctional monomer, for example, a compound based on (meth) acrylate, such as trimethylol-propane triacrylate or polyethylene glycol dimethacrylate; an allyl compound, such as diallyl phthalate or triallyl cyanurate; a compound based on maleimide, such as m-phenylene-bis-maleimide; and divinylbenzene.

The rubber composition according to the present invention may contain a filler (G) comprising, for example, a reinforcing agent and softener.

As the reinforcing agent, there may be enumerated, for example, carbon black, such as SRF, GPF, FEF, MAF, HAF, ISAF, SAF, FT and MT; surface-treated carbon black, prepared by subjecting the above carbon black product to surface treatment using, for example, a silane coupling agent; and other inorganic fillers, sich as silica, activated calcium carbonate, light calcium carbonate, heavy calcium carbonate, micropulverous talc, talc, micropulverous silica and clay.

The amount of the reinforcing agent to be compounded may favorably be at most 300 parts by weight, preferably in the rage from 10 to 300 parts by weight, more preferably from 10 to 200 parts by weight, per 100 parts by weight of the total sum of the copolymer based on non-conjugated cyclic polyene (A) and the diene-based rubber (B).

Using rubber composition containing such an amount of reinforcing agent, a vulcanized rubber exhibiting improved mechanical properties, such as tensile strength, tear strength and abrasion resistance, can be obtained. It is possible to increase the hardness without deteriorating other material properties of the vulcanized rubber and to attain reduction of costs.

As the softener mentioned above, those which have conventionally been incorporated in rubbers may widely be used. Concrete examples include softeners based on petroleum, such as process oils, lubricating oils, paraffines, liquid paraffine, petroleum asphalt and vaseline; softeners based on coal tar, such as coal tar and coal tar pitch; softeners based on fatty oil, such as castor oil, linseed oil, rapeseed oil and palm oil; waxes, such as tall oil, faktis, beeswax, carnauba wax and lanolin; fatty acids and fatty acid salts, such as ricinolic acid, palmitic acid, barium stearate, calcium stearate and zinc laurate; plasticizers based on esters, such as dioctyl phthalate, dioctyl adipate and dioctyl sebacate; and synthetic polymeric substances, such as petroleum resin, atactic polypropylene and cumarone-indene resin. Among them, those based on petroleum are preferred, with particular preference to process oils.

The amount of the softener to be compounded may favorably be at most 200 parts by weight, preferably in the range from 10 to 200 parts by weight, more preferably from 10 to 150 parts by weight, per 100 parts by weight of the total sum of the copolymer based on non-conjugated cyclic polyene (A) plus the diene-based rubber (B).

The rubber composition according to the present invention may contain, in addition to the components mentioned above, as other constituents, for example, compounds constituting foaming agent systems, such as foaming agent and forming assistant, antioxidant (stabilizer), processing assistant, plasticizer, colorant and other rubber additives and reagents. The amount of these other constituents may adequately be chosen for their sorts and amounts to be compounded.

The rubber composition according to the present invention, when containing compounds constituting a foaming agent system, such as foaming agent and foaming assistant, may be processed by foaming molding.

As the foaming agent, those which are used in general for foaming molding of rubber may widely be employed. Concrete examples thereof include inorganic foaming agent, such as sodium bicarbonate, sodium carbonate, ammonium bicarbonate, ammonium carbonate and ammonium nitrite; nitroso-compounds, such as N,N'-dimethyl-N,N'-dinitrosterephthalamide and N,N'-dinitrosopentamethylenetetramine; azo compounds, such as azodicarbonamide, azobisisobutyronitrile, azocyclohexylnitrile, azodiaminobenzene and barium azodicaboxylate; sulfonylhydrazides, such as benzenesulfonylhydrazide, toluenesulfonylhydrazide, p,p'-oxybis(benzenesulfonylhydrazide) and diphenylsulfon-3,3'-disulfonylhydrazide; and azides, such as calcium azide, 4,4-diphenyldisulfonyl azide and p-toluenesulfonyl azide. Among them, preference is given to nitroso-compounds, azo compounds and azides.

The foaming agent may be used in an amount in the range from 0.5 to 30 parts by weight, preferably from 1 to 20 parts by weight, per 100 parts by weight of the total sum of the copolymer based on non-conjugated cyclic polyene (A) plus the diene-based rubber (B). Using a rubber composition containing such an amount of the foaming agent, a foamed molding having an apparent density of 0.03–0.8 g/cm$^2$ can be obtained.

Together with the foaming agent, a foaming assistant may be employed. By using concurrently a foaming assistant, such effects as lowering of the decomposition temperature of the foaming agent, facilitation of the decomposition and homogenization of the foam cells may be attained. For such foaming assistant, there may be exemplified organic acids, such as salicylic acid, phthalic acid, stearic acid and oxalic acid, and urea and its derivatives.

The foaming assistant may be used in an amount of 0.01–10 parts by weight, preferably 0.1–5 parts by weight, per 100 parts by weight of the total sum of the copolymer based on non-conjugated cyclic polyene (A) plus the diene-based rubber (B).

It is preferable that the rubber composition according to the present invention contains an antioxidant, since the service life of the material can be extended thereby. As the antioxidant, there may be exemplified concretely stabilizers based on aromatic secondary amine, such as phenylnaphthylamine, 4,4'-(α,α'-dimethylbenzyl)diphenylamine and N,N'-di-2-naphthyl-p-phenylenediamine; stabilizers based on phenol, such as 2,6-di-tert-butyl-4-methylphenol and tetrakis-{methylene-3-(3',5'-di-tert-butyl-4'-hydroxyphenyl)propionate}methane; stabilizers based on thioether, such as bis{2-methyl-4-(3-n-alkylthiopropionyloxy)-5-tert-butylphenyl}sulfide and so on; stabilizers based on benzimidazole, such as 2-mercaptobenzimidazole and so on; stabilizers based on dithiocarbamate, such as nickel dibutyldithiocarbamate and so on; and stabilizers based on quinoline, such as polymerized products of 2,2,4-trimethyl-1,2-dihydroquinoline. These antioxidants may be used alone or in a combination of two or more.

The antioxidant may be used in an amount of at most 5 parts by weight, preferably at most 3 parts by weight, per 100 parts by weight of the total sum of the copolymer based on non-conjugated cyclic polyene (A) plus the diene-based rubber (B).

As the processing assistant, those employed in general for rubbers may be used widely. Concrete examples include acids, such as ricinoleic acid, stearic acid, palmitic acid and lauric acid and salts and esters of these acids, such as barium stearate, zinc stearate and calcium stearate.

The processing assistant may be used in an amount of at most 10 parts by weight, preferably at most 5 parts by weight, per 100 parts by weight of the total sum of the copolymer based on non-conjugated cyclic polyene (A) plus the diene-based rubber (B).

The rubber composition according to the present invention may be prepared from the copolymer based on non-conjugated cyclic polyene (A) and the diene-based rubber (B) together with the optionally incorporated other constituents given above by a preparation technique used in general for preparing rubber blends. It may be prepared by, for example, kneading the copolymer based on non-conjugated cyclic polyene (A), the diene-based rubber (B) and the optionally incorporated other constituents on an internal mixer, such as Bumbury's mixer, a kneader or Intermix, at a temperature of 80–170° C. for 3–10 minutes, and then, admixing thereto a vulcanizing agent (F) and, if necessary, a vualcanizing accelerator, vulcanization assistant, foaming agent and so on, whereupon the resulting mixture is kneaded on a roll, such as open roll, or on a kneader at a roll temperature of 40–80° C. for a period of 5–30 minutes, wherefrom the kneaded mass is taken out in portions. In this manner, the rubber composition (rubber blend) is prepared usually in a form of ribbon or sheet. In case where a low kneading temperature is permitted in the internal mixer, the vulcanizing agent (F), vulcanizing accelerator, foaming agent and so on may concurrently be admixed thereto.

The vulcanized product (vulcanized rubber) of the rubber composition according to the present invention may be obtained usually by subjecting the unvulcanized green rubber blend obtained as above to a preliminary forming by various forming techniques using forming apparatuses, such as extrusion molding machine, calender, press machine, injection molding machine and transfer molding machine, into a contemplated form and effecting the vulcanization of the resulting formed product, simultaneously with this forming or after the formed product has been transferred to a vulcanization vessel, by heating it or irradiating it by an electron beam. In the case of foamed product, the unvulcanized green rubber blend containing a foaming agent is subjected to vulcanization, as described above, wherein foaming of the formed product is attained simultaneously with the vulcanization so as to result in a foamed vulcanization product.

In the case of vulcanizing the rubber composition by heating, it is favorable to heat the formed product in a heating vessel, in a heating mode by hot air, glass beads fluidized bed, ultrahigh frequency electromagnetic wave (UHF), steam or hot molten-salt bath (LCM), at a temperature of 150–270° C. for 1–30 minutes.

In the case where the vulcanization is effected by irradiation with electron beam without incorporating the vulcanizing agent (F), the preliminarily formed rubber composition is irradiated with an electron beam of an energy of 0.1–10 MeV, preferably 0.3–2 MeV so as to reach an absorbed dose of 0.5–35 Mrad, preferably 0.5–10 Mrad.

For effecting the molding vulcanization, a mold may or may not be used. In the case wherein no mold is used, the rubber composition is molded and vulcanized usually in a continuous manner.

The rubber composition according to the present invention renders the improvement in the braking performance due to improvement of the gripping ability on the road face compatible with the improvement of the driving fuel cost aspect due to reduction of rolling resistance during steady maneuvering, so that tires in which the superior braking performance is made compatible with the superior fuel cost aspect can be obtained by using the rubber composition according to the present invention as the raw material. The rubber composition according to the present invention is also excellent in the weatherability, resistance to ozone, rubbery elasticity, mechanical strength, hardness and so on.

While the rubber composition according to the present invention may be used widely as starting material of various rubber articles, it can be used favorably as the rubber material for tires. Concrete examples of rubber material for tires include materials for tire tread and for tire side wall. Above all, the rubber composition according to the present invention can most preferably be used for the material (raw material) for tire tread, whereby tires in which the superior braking performance is made compatible with the superior driving fuel cost aspect with superior weatherability and anti-ozone performance can be obtained, wherein the characteristic properties of the rubber composition according to the present invention are revealed most effectively therefor.

The rubber material for tires according to the present invention comprises the copolymer based on non-conjugated cyclic polyene (A), wherein it may be constituted of only the copolymer based on non-conjugated cyclic polyene (A) or may comprise further constituents, such as other rubber(s) and additive(s). The content of the copolymer based on non-conjugated polyene (A) in the rubber material for tires according to the present invention may favorably be at least 3% by weight, preferably in the range from 5 to 90% by weight. The rubber material for tires according to the present invention has superior braking performance which is made compatible with the superior driving fuel cost aspect and the material is superior also in the rubbery elasticity, mechanical strength, weatherability, resistance to ozone, hardness and so on. As concrete examples of the rubber material for tires, those mentioned above may be recited.

The rubber material for tires according to the present invention comprises the rubber composition according to the present invention given above, wherein it may be composed of only the rubber composition according to the present invention or may comprise further constituents, such as other rubber(s) and additive(s). The content of the rubber composition according to the present invention in the rubber material for tires according to the present invention may favorably be at least 3% by weight, preferably in the range from 5 to 90% by weight. The rubber material for tires according to the present invention has superior braking performance which is made compatible with the superior driving fuel cost aspect and the material is superior also in the rubbery elasticity, mechanical strength, weatherability, resistance to ozone, hardness and so on. As concrete examples of the rubber material for tires, those mentioned above may be recited.

The tire tread according to the present invention is produced from the above rubber material for tires according to the present invention, wherein it may be produced from only the rubber material according to the present invention or may be produced under addition of further constituents, such as other rubber(s) and additive(s). The content of the rubber material according to the present invention in the tire tread according to the present invention may favorably be at least 3% by weight, preferably in the range from 5 to 90% by weight. The tire tread produced from the rubber composition or the rubber material for tires according to the present invention under vulcanization has superior braking performance which is made compatible with the superior driving fuel cost aspect and the tire tread is superior also in the weatherability, resistance to ozone and so on.

The tires according to the present invention is provided with the tire tread according to the present invention described above. The tires according to the present invention exhibit superior braking performance which is made compatible with the superior driving fuel cost aspect and the tires are superior also in the weatherability, resistance to ozone and so on.

As described above, the copolymer based on non-conjugated cyclic polyene according to the present invention is a novel materal and is useful, for example, for the constituent of rubber material for tires.

The rubber composition according to the present invention contains a copolymer based on non-conjugated cyclic polyene having specific material properties, on the one hand, and a rubber based on diene, on the other hand, in a specific proportion, from which tires exhibiting a superior braking performance and, in a compatible manner therewith, a superior driving fuel cost aspect can be produced.

The rubber material for tires according to the present invention comprises the above-mentioned copolymer based on non-conjugated cyclic polyene or the rubber composition, in which the superior braking performance is made compatible with the superior driving fuel cost aspect, and the material is superior also in the rubbery elasticity, mechanical strength, weatherability, resistance to ozone, hardness and so on.

The tire tread according to the present invention is produced from the above-mentioned rubber material for tires and has superior braking performance which is made compatible with the superior driving fuel cost feature and the tire tread is superior also in the weatherability, resistance to ozone and so on.

The tires according to the present invention are provided with the above-mentioned tire tread and have superior braking performance and, compatible therewith, superior driving fuel cost aspect and the tires are superior also in the weatherability, resistance to ozone and so on.

THE BEST MODE FOR EMBODYING THE INVENTION

Below, the present invention will be described by way of Examples.

EXAMPLES

Example 1

(Synthesis of a Copolymer based on Non-conjugated Cyclic Polyene)

An autoclave made of a stainless steel (SUS) of a capacity of 2 liters of which internal atmosphere had sufficiently been replaced with nitrogen was charged with 970 ml of heptane deprived of impurities and 30 ml of ENB at 23° C. and the autoclave made of SUS was heated up to 50° C. On reaching 50° C., ethylene was pressed into the autoclave until the total pressure of 0.78 MPa (8 kgf/cm$^2$, gauge) was reached. Thereinto was then pressed 1.0 mmol of triisobutylaluminum, whereupon 5 ml of a toluene solution of racemi-isopropylidenebis-(1-indenyl)zirconium dichloride/methylaluminoxane (with Zr concentration of 0.001 mmol/ml and Al concentration of 0.5 mmol/ml) were pressed thereinto. A commercial product of methylaluminoxane (of TOSOH AKZO K.K.) was used.

The polymerization was effected for 10 minutes after the introduction of the toluene solution of racemi-isopropylidenebis(1-indenyl)zirconium dichloride/methylaluminoxane. The original internal pressure of the autoclave directly after the introduction of the solution was maintained by pressing ethylene thereinto. After a prescribed reaction duration had been elapsed, the polymerization was terminated by introducing 3 ml of methanol to the autoclave by boosting with nitrogen.

As a result, 28 grams of an ethylene/ENB copolymer having an ethylene content of 87.6 mole %, an ENB content of 12.4 mole %, an intrinsic viscosity [η] of 1.1 dl/g and an iodine value of 80 were obtained. The Tg of this copolymer determined by a dynamic rheological observation was 13° C. The results are recited in Table 1.

Example 2

Polymerization was carried out in the same manner as in Example 1 execpt that the charged amount of ENB was changed. The r sults are recited in Table 1.

Example 3

(Synthesis of a Copolymer based on Non-conjugated Cyclic Polyene)

An autoclave made of a stainless steel (SUS) of a capacity of 2 liters of which internal atmosphere had sufficiently been replaced with nitrogen was charged with 950 ml of heptane deprived of impurities and 50 ml of ENB at 23° C. and the autoclave made of SUS was heated up to 80° C. On reaching 80° C., 70 N ml of hydrogen were added thereto, whereupon ethylene was pressed into the autoclave until the total pressure of 0.78 MPa (8 kgf/cm$^2$, gauge) was reached. Then, 0.35 mmol of triisobutylaluminum was first pressed thereinto, whereupon 1.5 ml (0.003 mmol) of a hexane solution of (tert-butylamido)dimethyl(tetramethyl-$\eta^5$-cyclopentadienyl)silanetitanium dichloride of a concentration of 0.002 mmol/ml and 5 ml (0.02 mmol) of a hexane slurry of $(C_6H_5)_3CB(C_6F_5)_4$ of a concentration of 0.004 mmol/ml were pressed thereinto individually of each other.

The polymerization was performed for three minutes after the introduction of $(C_6H_5)_3CB(C_6F_5)_4$. The original internal pressure of the autoclave directly after the introduction of the solution was maintained by pressing ethylene thereinto. After a prescribed reaction duration had been elapsed, the polymerization was terminated by introducing 3 ml of methanol to the autoclave by boosting with nitrogen.

As a result, 15 grams of an ethylene/ENB copolymer having an ethylene cont nt of 88.2 mole %, an ENB content of 11.8 mole %, an intrinsic viscosity [$\eta$] of 1.2 dl/g and an iodine value of 76 were obtained. The Tg of this copolymer determined by a dynamic Theological observation was 12° C. The results are recited in Table 1.

Example 4

(Synthesis of a Copolymer based on Non-conjugated Cyclic Polyene)

An autoclave made of a stainless steel (SUS) of a capacity of 2 liters of which internal atmosphere had sufficiently been replaced with nitrogen was charged with 990 ml of heptane deprived of impurities and 10 ml of ENB at 23° C. and the autoclave made of SUS was heated up to 30° C. On reaching 30° C., 100 N ml of hydrogen were added thereto, whereupon ethylene was pressed into the autoclave until the total pressure of 0.59 MPa (6 kgf/cm$^2$, gauge) was reached. Then, 1.0 mmol of ethylaluminum sesquichloride was first pressed thereinto, whereupon 10 ml (0.1 mmol) of a hexane solution of dichloroethoxyvanadium oxide of a concentration of 0.01 mmol/ml were pressed thereinto.

The polymerization was performed for two minutes after the introduction of the hexane solution of dichloroethoxyvanadium oxide. The original internal pressure of the autoclave directly after the introduction of the solution was maintained by pressing ethylene thereinto. After a prescribed reaction duration had been elapsed, the polymerization was terminated by introducing 10 ml of methanol to the autoclave by boosting with nitrogen.

As a result, 7 grams of an thylene/ENB copolymer having an ethylene content of 87.1 mole %, an ENB content of 12.9 mole %, an intrinsic viscosity [$\eta$] of 1.3 dl/g and an iodine value of 82 were obtained. The Tg of this copolymer determined by a dynamic rheological observation was 14° C. The results are recited in Table 1.

Example 5

(Synthesis of a Copolymer based on Non-conjugated Cyclic Polyene)

An autoclave made of a stainless steel (SUS) of a capacity of 2 liters of which internal atmosphere had sufficiently been replaced with nitrogen was charged with 860 ml of heptane deprived of impurities and 40 ml of ENB at 23° C. and the autoclave made of SUS was heated up to 80° C. On reaching 80° C., 20 N ml of hydrogen were added thereto, whereupon propylene was pressed into the autoclave up to a pressure of 0.25 MPa (2.5 kgf/cm$^2$, gauge) and finally, ethylene was pressed thereinto until a total pressure of 0.59 MPa (6 kgf/cm$^2$, gauge) was reached. Then, 0.35 mmol of triisobutylaluminum was first pressed thereinto, whereupon 1.5 ml (0.003 mmol) of a hexane solution of (tert-butylamido)dimethyl(tetramethyl-$\eta^5$-cyclopentadienyl)silanetitanium dichloride of a concentration of 0.002 mmol/ml and 2.5 ml (0.01 mmol) of a toluene solution of $(C_6H_5)_3CB(C_6F_5)_4$ of a concentration of 0.004 mmol/ml were pressed thereinto individually of each other.

The polymerization was performed for ten minutes after the introduction of $(C_6H_5)_3CB(C_6F_5)_4$. The original internal pressure of the autoclave directly after the introduction of the solution was maintained by pressing ethylene thereinto. After a prescribed reaction duration had been elapsed, the polymerization was terminated by introducing 3 ml of methanol to the autoclave by boosting with nitrogen.

As a result, 39.7 grams of an ethylene/propylene/ENB copolymer having an ethylene content of 49.6 mole %, a propylene content of 43.4 mole % and an ENB content of 7.0 mole %, an intrinsic viscosity [$\eta$] of 1.1 dl/g and an iodine value of 64 were obtained. The Tg of this copolymer determined by a dynamic rheological observation was −18° C. The results are recited in Table 2.

Example 6

(Synthesis of a Copolymer based on Non-conjugated Cyclic Polyene)

An autoclave made of a stainless steel (SUS) of a capacity of 2 liters of which internal atmosphere had sufficiently been replaced with nitrogen was charged with 836.7 ml of heptane deprived of impurities, 50 ml of ENB and 13.3 ml of dimethyldecatriene (DMDT) at 23° C. and the autoclave made of SUS was heated up to 80° C. On reaching 80° C., propylene was pressed into the autoclave up to a pressure of 0.25 MPa (2.5 kgf/cm$^2$, gauge) and then, ethylene was pressed thereinto until a total pressure of 0.59 MPa (6 kgf/cm$^2$, gauge) was reached. Then, 0.7 mmol of triisobutylaluminum was first pressed thereinto, whereupon 2.0 ml (0.004 mmol) of a hexane solution of (tert-butylamido)dimethyl(tetramethyl-$\eta^5$-cyclopentadienyl)silanetitanium dichloride of a concentration of 0.002 mmol/ml and 2.5 ml (0.01 mmol) of a toluene solution of $(C_6H_5)_3CB(C_6F_5)_4$ of a concentration of 0.004 mmol/ml were pressed thereinto individually of each other.

The polymerization was performed for 30 minutes after the introduction of $(C_6H_5)_3CB(C_6F_5)_4$. The original internal pressure of the autoclave directly after the introduction of the solution was maintained by pressing ethylene thereinto. After a prescribed reaction duration had been elapsed, the polymerization was terminated by introducing 3 ml of methanol to the autoclave by boosting with nitrogen.

As a result, 17.0 grams of an ethylene/propylene/ENB/DMDT copolymer having an ethylene content of 57.8 mole %, a propylene content of 34.1 mole %, an ENB content of 6.8 mole %, a DMDT content of 1.3 mole %, an intrinsic viscosity [$\eta$] of 1.1 dl/g and an iodine value of 73 were obtained. The results are recited in Table 2.

TABLE 1

|  |  | Example | | | |
|---|---|---|---|---|---|
|  |  | 1 | 2 | 3 | 4 |
| ENB charged (ml) | | 30 | 60 | 50 | 10 |
| Copolymer composition | | | | | |
| Ethylene | (mole %) | 87.6 | 81.5 | 88.2 | 87.1 |
| ENB | (mole %) | 12.4 | 18.5 | 11.8 | 12.9 |
| Material properties | | | | | |
| $[\eta]^{*1}$ | (dl/g) | 1.1 | 1.1 | 1.2 | 1.3 |
| $Tg^{*2}$ | (° C.) | 13 | 26 | 12 | 14 |
| Iodine value | | 80 | 104 | 76 | 82 |

Notes in Tables 1 and 2:
*1[η]: intrinsic viscosity [η], determined in decalin at 135° C.
*2Tg: determined by preparing a test specimen of a ribbon of 10 mm width, 2 mm thickness and 30 mm length and subjecting this specimen to a dynamic viscoelasticity test using a tester of Model RDS II of the firm Rheometric at a vibration frequency of 10 Hz, a strain of 0.1%, and a temperature elevation rate of 2° C./min., wherein the peak temperature on damping factor (tan δ) is assumed as Tg.

TABLE 2

|  |  | Example | |
|---|---|---|---|
|  |  | 5 | 6 |
| Copolymer composition | | | |
| Ethylene | (mole %) | 49.6 | 57.8 |
| Propylene | (mole %) | 43.4 | 34.1 |
| ENB | (mole %) | 7.0 | 6.8 |
| DMDT | (mole %) | — | 1.3 |
| Material properties | | | |
| $[\eta]^{*1}$ | (dl/g) | 1.1 | 1.1 |
| $Tg^{*2}$ | (° C.) | −18 | −19 |
| Iodine value | (g/100 g) | 64 | 73 |

Notes in Tables 1 and 2:
*1[η]: intrinsic viscosity [η], determined in decalin at 135° C.
*2Tg: determined by preparing a test specimen of a ribbon of 10 mm width, 2 mm thickness and 30 mm length and subjecting this specimen to a dynamic viscoelasticity test using a tester of Model RDS II of the firm Rheometric at a vibration frequency of 10 Hz, a strain of 0.1%, and a temperature elevation rate of 2° C./min., wherein the peak temperature on damping factor (tan δ) is assumed as Tg.

Example 7

Using the components as given in Table 3 in a proportion given therein, a green unvulcanized rubber blend was prepared by kneading them on an open roll (60° C. for the fore side roll/60° C. for the aft side roll; 16 r.p.m. of fore side roll/18 r.p.m. of aft side roll). This green rubber blend was processed on a press heated at 160° C. for 20 minutes into a vulcanized sheet, with which the following tests were carried out. The results are recited in Table 4.

TABLE 3

| Composition (part by weight) | |
|---|---|
|  | Example 7 |
| Copolymer of Example 1*1 | 10 |
| SBR*2 | 90 |
| Zinc white | 5 |
| Stearic acid | 1 |
| Carbon black HAF*3 | 50 |
| Naphthene base oil*4 | 5 |
| Vulcan. accelerator CBZ*5 | 0.5 |

TABLE 3-continued

| Composition (part by weight) | |
|---|---|
|  | Example 7 |
| Vulcan. accelerator DPG*6 | 1.0 |
| Sulfur | 2.0 |

*1Copolymer of Example 1: see Table 1
*2SBR = a styrene/butadiene rubber NIPPOL 1502 (trademark) of Nippon Zeon Co., Ltd., with iodine value of 357
*3Carbon black HAF = HAF ASAHI #70 (trademark), a product of Asahi Carbon K. K.
*4Naphthene base oil: SUNSEN 4240 (trademark) of Nippon Sun Oil Co., Ltd.
*5Vulcan. accelerator CBZ: SANCELER CM (trademark) of Sanshin Chemical Industry Co., Ltd.
*6Vulcan. accelerator DPG: SANCELER D (trademark) of Sanshin Chemical Industry Co., Ltd.

Comparative Example 1

The procedures of Example 7 wer followed except that the copolymer based on non-conjugated cyclic polyene was not used and 100 parts by weight of SBR were incorporated. The results are recited in Table 4.

TABLE 4

|  |  | Example 7 | Comp. Example 1 |
|---|---|---|---|
| $T_B^{*1}$ | (MPa) | 21 | 25 |
| $E_B^{*2}$ | (%) | 470 | 470 |
| $HS^{*3}$ | (JIS A) | 63 | 61 |
| Resist. to ozone*4 | | unvaried | C-4 |
| tan δ*5 | (0° C.) | 0.23 | 0.17 |
| tan δ*5 | (50° C.) | 0.15 | 0.16 |

*1$T_B$ = Tensile strength at break (JIS K 6301)
*2$E_B$ = Elongation at break (JIS K 6301)
*3HS (JIS A) = Hardness
*4Resist. to ozone: determined in accordance with the prescription of JIS K 6301 under the condition of 40° C., an ozone concentration of 50 pphm and 24 hours. The number (i) and size and depth (ii) of cracks occurred are observed and assessed by the following criterion and the state of deterioration is recorded by combining (i) and (ii).
  (i) Number of cracks:
    A: scarce number of cracks are observed
    B: a large number of cracks are observed
    C: innumerable number of cracks are observed
  (ii) Size and depth of cracks:
    1: not visible by naked eye but visible by a magnifying glass of magnification of 10 times
    2: visible by naked eye
    3: deep and relatively large (less than 1 mm)
    4: deep and large (more than 1 mm, less than 3 mm)
    5: at least 3 mm or nearly going to break
*5tan δ: The tan δ value (damping factor) of the rubber composition at 0° C. is taken as the parameter of braking performance of tire. The higher the tan δ value at 0° C., the better the braking performance will be. The tan δ value (damping factor) at 50° C. of the rubber composition is taken as the parameter of driving fuel cost aspect of automobile. The lower the tan δ value at 50° C., the higher the fuel cost aspect will be. Determination of tan δ (damping factor) is carried out, using a test specimen of 10 mm width, 2 mm thickness and 30 mm length prepared from the rubber composition, on a testing apparatus RDS-II of the firm Rheometric from the temperature dispersion of viscoelasticity observed at 1 Hz (6.28 rad/sec).

Example 8

Using the components as given in Table 5 in a proportion given therein, a green unvulcanized rubber blend was prepared by kneading them on an open roll (60° C. for the fore side roll/60° C. for the aft side roll; 16 r.p.m. of fore side roll/18 r.p.m. of aft side roll). This green rubber blend was processed on a press heated at 160° C. for 20 minutes into a vulcanized sheet, with which the following tests were carried out. The results are recited in Table 6.

TABLE 5

| Composition (part by weight) | |
|---|---|
| | Example 8 |
| Copolymer of Example 5*1 | 10 |
| SBR*2 | 90 |
| Zinc white | 3 |
| Stearic acid | 1 |
| Carbon black HAF*3 | 50 |
| Vulcan. accelerator CBZ*4 | 0.5 |
| Sulfur | 1.75 |

*1Copolymer of Example 5: see Table 1
*2SBR = a styrene/butadiene rubber NIPPOL 1502 (trademark) of Nippon Zeon Co., Ltd., with iodine value of 357
*3Carbon black HAF = HAF ASAHI #70 (trademark), a product of Asahi Carbon K. K.
*4Vulcan. accelerator CBZ: SANCELER CM (trademark) of Sanshin Chemical Industry Co., Ltd.

Comparative Example 2

The procedures of Example 8 were followed except that the copolymer based on non-conjugated cyclic polyene was not used and 100 parts by weight of SBR were incorporated. The results are recited in Table 6.

TABLE 6

| | | Example 8 | Comp. Example 2 |
|---|---|---|---|
| $T_B$*1 | (MPa) | 26.7 | 28.1 |
| $E_B$*2 | (%) | 390 | 360 |
| HA*3 | (Shore A) | 70 | 70 |
| tan δ*4 | (0° C.) | 0.211 | 0.162 |
| tan δ*4 | (60° C.) | 0.141 | 0.134 |

*1$T_B$ = Tensile strength at break (JIS K 6301)
*2$E_B$ = Elongation at break (JIS K 6301)
*3HA (Shore A) = Hardness
*4tan δ: The tan δ value (damping factor) of the rubber composition at 0° C. is taken as the parameter of braking performance of tire. The higher the tan δ value at 0° C., the better the braking performance will be. The tan δ value (damping factor) at 60° C. of the rubber composition is taken as the parameter of driving fuel cost aspect of automobile. The lower the tan δ value at 60° C., the higher the fuel cost feature will be. The tan δ (damping factor) is determined, using a test specimen of 10 mm width, 2 mm thickness and 30 mm length prepared from the rubber composition, on a testing apparatus RDS-II of the firm Rheometric from the temperature dispersion of viscoelasticity observed under a condition of 0.05% strain and 10 Hz.

INDUSTRIAL APPLICABILITY

As described above, the copolymer based on non-conjugated cyclic polyene and the rubber composition according to the present invention can be used as a constituent of, for example, rubber material for tires, tire treads and tires.

What is claimed is:

1. A random copolymer based on non-conjugated cyclic polyene comprising structural units originated from one or more α-olefins (A1) and originated from one or more non-conjugated cyclic polyenes (A2), the said random copolymer having characteristic features comprising:
    a content of the structural unit(s) originated from the said one or more α-olefins (A1) in the range of 93 to 70 mole %,
    a content of the structural units originated from the said one or more non-conjugated cyclic polyenes (A2) in the range of 7 to 30 mole %,
    an intrinsic viscosity [η], determined in decahydronaphthalene at 135° C., in the range of 0.01 to 20 dl/g,
    a glass transition temperature (Tg) of −30° C. to +40° C., and
    an iodine value in the range of 35 to 150.

2. A random copolymer based on non-conjugated cyclic polyene comprising structural units originated from one or more α-olefins (A1), originated from one or more non-conjugated cyclic polyenes (A2) and originated from one or more non-conjugated linear polyenes (A3), the said random copolymer having characteristic features comprising:
    a content of the structural unit(s) originated from the said one or more α-olefins (A1) in the range of 97.9 to 55 mole %,
    a content of the structural unit originated from the said one or more non-conjugated cyclic polyenes (A2) in the range of 2 to 30 mole %,
    a content of the structural unit originated from the said one or more non-conjugated linear polyenes (A3) in the range from 0.1 to 15 mole %,
    an intrinsic viscosity [η], determined in decahydronaphthalene at 135° C., in the range of 0.01 to 20 dl/g,
    a glass transition temperature (Tg) −30° C. to +40° C., and
    an iodine value in the range of 5 to 150.

3. The random copolymer as claimed in claim 1 or 2, wherein the structural unit(s) originated from one or more α-olefins (A1) comprise at least a structural unit originated from ethylene in which the mole ratio of (the structural unit originated from ethylene) versus (the structural unit(s) originated from other α-olefin(s) having 3 or more carbon atoms) is in the range from 100/0 to 1/99.

4. The random copolymer as claimed in claim 1 or 2, wherein the structural unit(s) originated from one or more α-olefins (A1) comprise at least a structural unit originated from ethylene in which the mole ratio of (the structural unit originated from ethylene) versus (the structural unit(s) originated from other α-olefin(s) having 3 or more carbon atoms) is in the range from 100/0 to 50/50.

5. A rubber composition comprising
    (A) a random copolymer based on non-conjugated cyclic polyene comprising structural units originated from one or more α-olefins (A1) and originated from one or more non-conjugated cyclic polyene (A2), the said random copolymer having characteristic features comprising:
        a content of the structural unit(s) originated from the said one or more α-olefins (A1) in the range of 93 to 70 mole %; a content of the structural unit originated from the said one or more non-conjugated cyclic polyenes (A2) in the range of 7 to 30 mole %; an intrinsic viscosity [η], determined in decahydronaphthalene at 135° C., in the range of 0.01 to 20 dl/g; a glass transition temperature (TG) of −30° C. to +40° C.; and an iodine value in the range of 35 to 150; and
    (B) a rubber based on diene, wherein the weight proportion of (the random copolymer based on non-conjugated cyclic polyene) versus (the rubber based on diene), namely, (A/B), is in the range of 60/40 to 0.1/99.9.

6. A rubber composition comprising:
    (A) a random copolymer based on non-conjugated cyclic polyene comprising structural units originated from one or more α-olefins (A1) and originated from one or more non-conjugated cyclic polyenes (A2) and originated from one or more non-conjugated linear polyene (A3), the said random copolymer having characteristic features comprising:

a content of the structural unit(s) originated from the said one or more α-olefins (A1) in the range of 97.9 to 55 mole %; a content of the structural unit originated from the said one or more non-conjugated cyclic polyenes (A2) in the range of 2 to 30 mole %; a content of the structural unit originated from the said one or more non-conjugated linear polyene (A3) in the range of 0.1 to 15 mole %; an intrinsic viscosity [η], determined in decahydronaphthalene at 135° C., in the range of 0.01 to 20 dl/g; a glass transition temperature (Tg) of −30° C. to +40° C.; and an iodine value in the range of 5 to 150, and (B) a rubber based on diene, wherein the weight proportion of (the random copolymer based on non-conjugated cyclic polyene) versus (the rubber based on diene), namely, (A)/(B), is in the range from 60/40 to 0. 1/99.9.

7. The rubber composition as claimed in claim 5 or 6, wherein the structural unit(s) originated from one or more α-olefins (A1) in the random copolymer based on non-conjugated cyclic polyene comprise at least a structural unit originated from ethylene, wherein the mole ratio of (the structural unit originated from ethylene) versus (the structural unit(s) originated from other α-olefin(s) having 3 or more carbon atoms) is in the range from 100/0 to 1/99.

8. The rubber composition as claimed in claim 5 or 6, wherein the structural unit(s) originated from one or more α-olefins (A1) in the random copolymer based on non-conjugated cyclic polyene comprise at least a structural unit originated from ethylene, wherein the mole ratio of (the structural unit originated from ethylene) versus (the structural unit(s) originated from other α-olefin(s) having 3 or more carbon atoms) is in the range from 100/0 to 50/50.

9. The random copolymer as claimed in claim 1, wherein the non-conjugated cyclic polyene (A2) is that represented by the formula (1-1) given below:

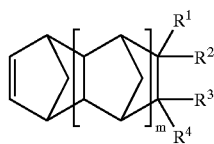

(1-1)

in which m is an integer of 0 to 2, $R^1$ to $R^4$ denote each, independently of each other, an atom or a residue selected from the group consisting of hydrogen atom, halogen atoms and hydrocarbon residues which may have double bond, wherein $R^1$ to $R^4$ may be fused together to form a mono- or polycyclic ring which may have double bond or wherein an alkylidene radical may be formed from the pair of $R^1$ and $R^2$ or $R^3$ and $R^4$ or, further $R^1$ and $R^3$ or $R^2$ and $R^4$ may be fused together so as to form a double bond, with the proviso that at least one of $R^1$ to $R^4$ stands for an unsaturated hydrocarbon residue having at least one double bond, in case the mono- or polycyclic ring formed from $R^1$ to $R^4$ by being fused together has no double bond, in case the pair of $R^1$ and $R^2$ or $R^3$ and $R^4$ does not form an alkylidene radical and in case $R^1$ and $R^3$ or $R^2$ and $R^4$ are not fused together to form an endocyclic bond.

10. The random copolymer as claimed in claim 2, wherein the non-conjugated cyclic polyene (A2) is that represented by the formula (1-1) given below:

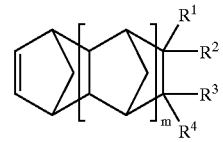

(1-1)

in which m is an integer of 0 to 2, $R^1$ to $R^4$ denote each, independently of each other, an atom or a residue selected from the group consisting of hydrogen atom, halogen atoms and hydrocarbon residues which may have double bond, wherein $R^1$ to $R^4$ may be fused together to form a mono- or polycyclic ring which may have double bond or wherein an alkylidene radical may be formed from the pair of $R^1$ and $R^2$ or $R^3$ and $R^4$ or, further, $R^1$ and $R^3$ or $R^2$ and $R^4$ may be fused together so as to form a double bond, with the proviso that at least one of $R^1$ to $R^4$ stands for an unsaturated hydrocarbon residue having at least one double bond, in case the mono- or polycyclic ring formed from $R^1$ to $R^4$ by being fused together has no double bond, in case the pair of $R^1$ and $R^2$ or $R^3$ and $R^4$ does not form an alkylidene radical and in case $R^1$ and $R^3$ or $R^2$ and $R^4$ are not fused together to form an endocyclic double bond.

11. The random copolymer as claimed in claim 9, wherein the structural unit(s) originated from one or more α-olefins (A1) comprise at least a structural unit originated from ethylene in which the mole ratio of (the structural unit originated from ethylene) versus (the structural unit(s) originated from other α-olefin(s) having 3 or more carbon atoms) is in the range of from 100/0 to 1/99.

12. The random copolymer as claimed in claim 10, wherein the structural unit(s) originated from one or more α-olefins (A1) comprise at least a structural unit originated from ethylene in which the mole ratio of (the structural unit originated from ethylene) versus (the structural unit(s) originated from other α-olefin(s) having 3 or more carbon atoms) is in the range of from 100/0 to 1/99.

13. The random copolymer as claimed in claim 9, wherein the structural unit(s) originated from one or more α-olefins (A1) comprise at least a structural unit originated from ethylene in which the mole ratio of (the structural unit originated from ethylene) versus (the structural unit(s) originated from other α-olefin(s) having 3 or more carbon atoms) is in the range of from 100/0 to 50/50.

14. The random copolymer as claimed in claim 10, wherein the structural unit(s) originated from one or more α-olefins (A1) comprise at least a structural unit originated from ethylene in which the mole ratio of (the structural unit originated from ethylene) versus (the structural unit(s) originated from other α-olefin(s) having 3 or more carbon atoms) is in the range of from 100/0 to 50/50.

15. The random copolymer as claimed in claim 2, wherein the non-conjugated linear polyene (A3) is represented by the formula (2-1) given below:

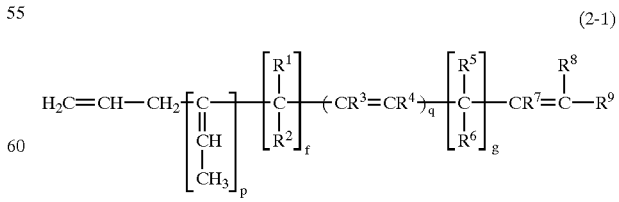

(2-1)

in which p and q is zero or 1 with the proviso that p and q are not zero simultaneously, f is an integer of zero to 5 with the proviso that f is not zero when both p and q are 1, g is an integer of 1 to 6, $R^1$, $R^2$, $R^3$, $R^4$, $R^5$, $R^6$ and $R^7$ denote each, independently of each other, hydrogen atom or an alkyl group having 1–3 carbon atoms, $R^8$ denotes an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

16. The random copolymer as claimed in claim 10, wherein the non-conjugated linear polyene (A3) is represented by the formula (2-1) given below:

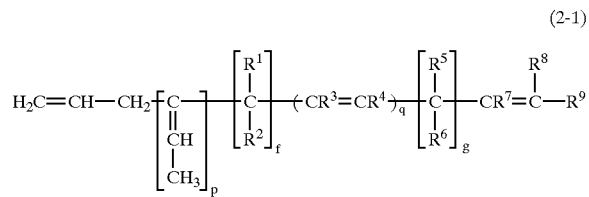

(2-1)

in which p and q is zero or 1 with the proviso that p and q are not zero simultaneously, f is an integer of zero to 5 with the proviso that f is not zero when both p and q are 1, g is an integer of 1 to 6, $R^1$, $R^2$, $R^3$, $R^4$, $R^5$, $R^6$ and $R^7$ denote each, independently of each other, hydrogen atom or an alkyl group having 1–3 carbon atoms, $R^8$ denotes an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

17. The random copolymer as claimed in claim 12, wherein the non-conjugated linear polyene (A3) is represented by the formula (2-1) given below:

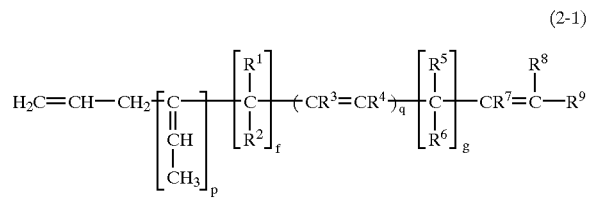

(2-1)

in which p and q is zero or 1 with the proviso that p and q are not zero simultaneously, f is an integer of zero to 5 with the proviso that f is not zero when both p and q are 1, g is an integer of 1 to 6, $R^1$, $R^2$, $R^3$, $R^4$, $R^5$, $R^6$ and $R^7$ denote each, independently of each other, hydrogen atom or an alkyl group having 1–3 carbon atoms, $R^8$ denotes an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

18. The random copolymer as claimed in claim 14, wherein the non-conjugated linear polyene (A3) is represented by the formula (2-1) given below:

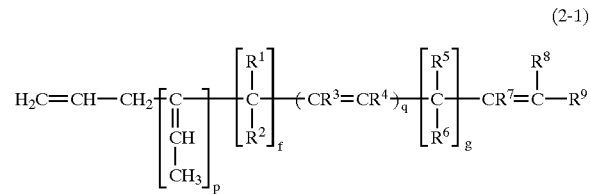

(2-1)

in which p and q is zero or 1 with the proviso that p and q are not zero simultaneously, f is an integer of zero to 5 with the proviso that f is not zero when both p and q are 1, g is an integer of 1 to 6, $R^1$, $R^2$, $R^3$, $R^4$, $R^5$, $R^6$ and $R^7$ denote each, independently of each other, hydrogen atom or an alkyl group having 1–3 carbon atoms, $R^8$ denotes an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

19. The rubber composition as claimed in claim 5, wherein the non-conjugated cyclic polyene (A2) is that represented by the formula (1-1) given below:

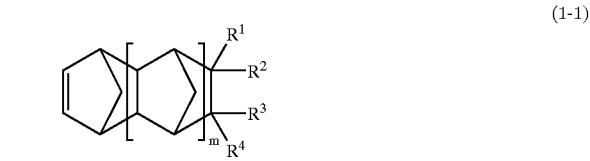

(1-1)

in which m is an integer of 0 to 2, $R^1$ to $R^4$ denote each, independently of each other, an atom or a residue selected from the group consisting of hydrogen atom, halogen atoms and hydrocarbon residues which may have double bond, wherein $R^1$ to $R^4$ may be fused together to form a mono- or polycyclic ring which may have double bond or wherein an alkylidene radical may be formed from the pair of $R^1$ and $R^2$ or $R^3$ and $R^4$ or, further, $R^1$ and $R^3$ or $R^2$ and $R^4$ may be fused together so as to form a double bond, with the proviso that at least one of $R^1$ to $R^4$ stands for an unsaturated hydrocarbon residue having at least one double bond, in case the mono- or polycyclic ring formed from $R^1$ to $R^4$ by being fused together has no double bond, in case the pair of $R^1$ and $R^2$ or $R^3$ and $R^4$ does not form an alkylidene radical and in case $R^1$ and $R^3$ or $R^2$ and $R^4$ are not fused together to form an endocyclic double bond.

20. The rubber composition as claimed in claim 6, wherein the non-conjugated cyclic polyene (A2) is that represented by the formula (1-1) given below:

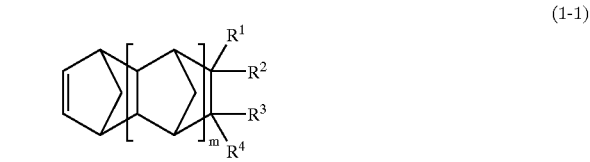

(1-1)

in which m is an integer of 0 to 2, $R^1$ to $R^4$ denote each, independently of each other, an atom or a residue selected from the group consisting of hydrogen atom, halogen atoms and hydrocarbon residues which may have double bond, wherein $R^1$ to $R^4$ may be fused together to form a mono or polycyclic ring which may have double bond or wherein an alkylidene radical may be formed from the pair of $R^1$ and $R^2$ or $R^3$ and $R^4$ or, further, $R^1$ and $R^3$ or $R^2$ and $R^4$ may be fused together so as to form a double bond, with the proviso that at least one of $R^1$ to $R^4$ stands for an unsaturated hydrocarbon residue having at least one double bond, in case the mono- or polycyclic ring formed from $R^1$ to $R^4$ by being fused together has no double bond, in case the pair of $R^1$ and $R^2$ or $R^3$ and $R^4$ does not form an alkylidene radical and in case $R^1$ and $R^3$ or $R^2$ and $R^4$ are not fused together to form an endocyclic double bond.

21. The rubber composition as claimed in claim 19, wherein the structural unit(s) originated from one or more α-olefins (A1) in the random copolymer based on non-conjugated cyclic polyene comprise at least a structural unit originated from ethylene, wherein the mole ratio of (the structural unit originated from ethylene) versus (the structural unit(s) originated from other α-olefin(s) having 3 or more carbon atoms) is in the range of from 100/0 to 1/99.

22. The rubber composition as claimed in claim 20, wherein the structural unit(s) originated from one or more α-olefins (A1) in the random copolymer based on non-conjugated cyclic polyene comprise at least a structural unit originated from ethylene, wherein the mole ratio of (the structural unit originated from ethylene) versus (the structural unit(s) originated from other α-olefin(s) having 3 or more carbon atoms) is in the range of from 100/0 to 1/99.

23. The rubber composition as claimed in claim 19, wherein the structural unit(s) originated from one or more α-olefins (A1) in the random copolymer based on non-conjugated cyclic polyene comprise at least a structural unit originated from ethylene, wherein the mole ratio of (the structural unit originated from ethylene) versus (the structural unit(s) originated from other α-olefin(s) having 3 or more carbon atoms) is in the range of from 100/0 to 50/50.

24. The rubber composition as claimed in claim 20, wherein the structural unit(s) originated from one or more α-olefins (A1) in the random copolymer based on non-conjugated cyclic polyene comprise at least a structural unit originated from ethylene, wherein the mole ratio of (the structural unit originated from ethylene) versus (the structural unit(s) originated from other α-olefin(s) having 3 or more carbon atoms) is in the range of from 100/0 to 50/50.

25. The rubber composition as claimed in claim 6, wherein the non-conjugated linear polyene (A3) is represented by the formula (2-1) given below:

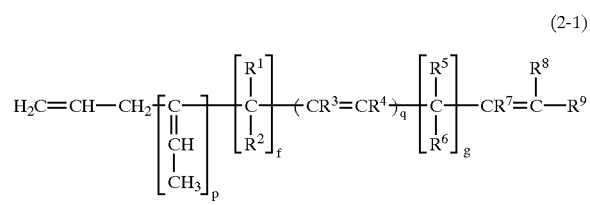

(2-1)

in which p and q is zero or 1 with the proviso that p and q are not zero simultaneously, f is an integer of zero to 5 with the proviso that f is not zero when both p and q are 1, g is an integer of 1, to 6, $R^1$, $R^2$, $R^3$, $R^4$, $R^5$, $R^6$ and $R^7$ denote each, independently of each the hydrogen atom or an alkyl group having 1–3 carbon atoms, $R^8$ denotes an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

26. The rubber composition as claimed in claim 20, wherein the non-conjugated linear polyene (A3) is represented by the formula (2-1) given below:

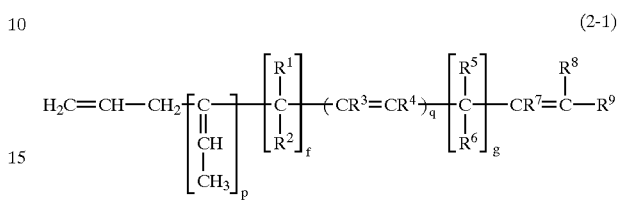

(2-1)

in which p and q is zero or 1 with the proviso that p and q are not zero simultaneously, f is an integer of zero to 5 with the proviso that f is not zero when both p and q are 1, g is an integer of 1 to 6, $R^1$, $R^2$, $R^3$, $R^4$, $R^5$, $R^6$ and $R^7$ denote each, independently of each hydrogen atom or an alkyl group having 1–3 carbon atoms, $R^8$ denotes an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

27. The rubber composition as claimed in claim 22, wherein the non-conjugated linear polyene (A3) is represented by the formula (2-1) given below:

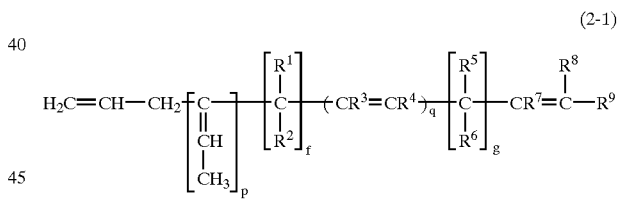

(2-1)

in which p and q is zero or 1 with the proviso that p and q are not zero simultaneously, f is an integer of zero to 5 with the proviso that f is not zero when both p and q are 1, g is an integer of 1 to 6, $R^1$, $R^2$, $R^3$, $R^4$, $R^5$, $R^6$ and $R^7$ denote each, independently of each other, hydrogen atom or an alkyl group having 1–3 carbon atoms, $R^1$ denotes an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

28. The rubber composition as claimed in claim 24, wherein the non-conjugated linear polyene (A3) is represented by the formula (2-1) given below:

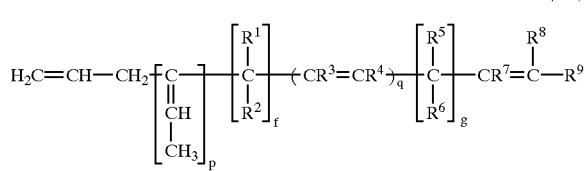

(2-1)

in which p and q is zero or 1 with the proviso that p and q are not zero simultaneously, f is an integer of zero to 5 with the proviso that f is not zero when both p and q are 1, g is an integer of 1 to 6, $R^1$, $R^2$, $R^3$, $R^4$, $R^5$, $R^6$ and $R^7$ denote each, independently of each other hydrogen atom or an alkyl group having 1–3 carbon atoms, $R^8$ denotes an alkyl group having 1–3 carbon atoms and $R^9$ denotes hydrogen atom, an alkyl group having 1–3 carbon atoms or a group represented by —$(CH_2)n$-$CR^{10}$=$C(R^{11})R^{12}$ in which n is an integer of 1 to 5, $R^{10}$ and $R^{11}$ represent each, independently of each other, hydrogen atom or an alkyl group having 1–3 carbon atoms and $R^{12}$ represents an alkyl group having 1–3 carbon atoms, with the proviso that $R^9$ is hydrogen atom or an alkyl group having 1–3 carbon atoms when both p and q are 1.

29. A rubber material for tires, comprising the random copolymer based on non-conjugated cyclic polyene as claimed in any one of claim 1, 2, 9, 10 or 15.

30. A rubber material for tires, comprising the rubber composition as claimed in any one of claim 5, 6, 19, 20 or 25.

31. A tire tread produced from the rubber material for tires as claimed in claim 29.

32. A tire tread produced from the rubber material for tires as claimed in claim 30.

33. A tire which has a tire tread as claimed in claim 31.

34. A tire which has a tire tread as claimed in claim 32.

* * * * *